(12) United States Patent
Yoshioka et al.

(10) Patent No.: US 9,115,657 B2
(45) Date of Patent: Aug. 25, 2015

(54) CONTROL APPARATUS FOR ENGINE

(71) Applicant: AISAN KOGYO KABUSHIKI KAISHA, Obu-shi, Aichi (JP)

(72) Inventors: Mamoru Yoshioka, Nagoya (JP); Takehide Nakamura, Handa (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 282 days.

(21) Appl. No.: 13/933,651

(22) Filed: Jul. 2, 2013

(65) Prior Publication Data

US 2014/0020664 A1 Jan. 23, 2014

(30) Foreign Application Priority Data

Jul. 17, 2012 (JP) .................. 2012-158459

(51) Int. Cl.
| F02D 41/12 | (2006.01) |
| F02D 41/00 | (2006.01) |
| F02B 33/00 | (2006.01) |
| F02B 33/44 | (2006.01) |
| F02M 25/07 | (2006.01) |
| F02P 5/15 | (2006.01) |
| F02D 11/10 | (2006.01) |
| F02D 37/02 | (2006.01) |

(52) U.S. Cl.
CPC ............ F02D 41/0005 (2013.01); F02B 33/00 (2013.01); F02B 33/446 (2013.01); F02D 11/10 (2013.01); F02D 37/02 (2013.01); F02D 41/005 (2013.01); F02D 41/0007 (2013.01); F02D 41/12 (2013.01); F02M 25/0709 (2013.01); F02P 5/1516 (2013.01); *Y02T 10/144* (2013.01); *Y02T 10/42* (2013.01); *Y02T 10/46* (2013.01); *Y02T 10/47* (2013.01)

(58) Field of Classification Search
CPC . F02D 41/0005; F02D 41/12; F02D 41/0007; F02D 41/005; F02M 25/0709; F02P 5/1516
USPC ............ 123/568.11, 568.12, 568.21, 568.22, 123/542, 339.23, 568.19
See application file for complete search history.

(56) References Cited

U.S. PATENT DOCUMENTS 5,168,954 A * 12/1992 Nakaniwa et al. ............ 180/197

FOREIGN PATENT DOCUMENTS

| JP | A-10-68344 | 3/1998 |
| JP | A-2012-7547 | 1/2012 |

* cited by examiner

Primary Examiner — Mahmoud Gimie
(74) Attorney, Agent, or Firm — Oliff PLC

(57) ABSTRACT

An engine includes an injector, an ignition plug, a supercharger, an electronic throttle device, and an EGR apparatus. An EGR passage has an inlet connected to an exhaust passage downstream of a turbine and an outlet connected to the intake passage upstream from a compressor. A fresh-air introduction passage is arranged to introduce fresh air to a surge tank downstream from the electronic throttle device and a fresh-air control valve is provided to regulate a fresh air amount. When an ECU determines that the engine is under deceleration and under fuel supply, the ECU closes the electronic throttle device to a predetermined opening degree to scavenge EGR gas flowing from the EGR passage and remaining in the intake passage, opens a fresh-air control valve to a predetermined opening degree, and causes the ignition plug to retard an ignition timing.

15 Claims, 21 Drawing Sheets

EE: EGR Valve Opening Degree
TT: Throttle Opening Degree

XX: With Residual-EGR-Gas Scavenging Control
YY: Withpit Residual-EGR-Gas Scavenging Control EE: EGR Valve Opening Degree
TT: Throttle Opening Degree

CONTROL APPARATUS FOR ENGINE

CROSS-REFERENCE TO RELATED APPLICATIONS

This application is based upon and claims the benefit of priority from the prior Japanese Patent Application No. 2012-158459 filed on Jul. 17, 2012, the entire contents of which are incorporated herein by reference.

BACKGROUND OF THE INVENTION

1. Field of the Invention

The present invention relates to a control apparatus for an engine, including a supercharger to increase the pressure of intake air of the engine, an intake-air amount regulating valve to regulate an intake air amount in the engine, and an exhaust gas recirculation apparatus to circulate part of exhaust gas of the engine back to the engine, the control apparatus being arranged to control them according to an operating condition of the engine.

2. Related Art

Conventionally, a technique of the above type is employed in a vehicle engine, for example. An exhaust gas recirculation (EGR) apparatus is arranged to introduce part of exhaust gas after combustion, which is discharged from a combustion chamber of an engine to an exhaust passage, into an intake passage through an EGR passage so that the exhaust gas is mixed with intake air flowing in the intake passage and flows back to the combustion chamber. An amount of EGR gas flowing in the EGR passage is regulated by an EGR valve provided in the EGR passage. This EGR can reduce mainly nitrogen oxide (NOx) in the exhaust gas and improve fuel consumption during a partial load operation of the engine.

Exhaust gas from the engine contains no oxygen or is in an oxygen lean state. Thus, when part of the exhaust gas is mixed with the intake air by EGR, the oxygen concentration of the intake air decreases. In a combustion chamber, therefore, fuel burns in a low oxygen concentration. Thus, a peak temperature during combustion decreases, thereby restraining the occurrence of NOx. In a gasoline engine, even when the content of oxygen in intake air is not increased by EGR and a throttle valve is closed to some degree, it is possible to reduce pumping loss of the engine.

Herein, recently, it is conceivable to perform EGR in the entire operating region of the engine in order to further improve fuel consumption. Realization of high EGR is thus demanded. To realize the high EGR, it is necessary for conventional arts to increase the internal diameter of an EGR passage or increase the opening area of a flow passage provided by a valve element and a valve seat of an EGR valve. That is, an EGR valve has to be increased in size.

Meanwhile, it is well known that an engine including a supercharger is also provided with an EGR apparatus. JP-A-2012-7547 discloses this type of an engine. This engine includes a supercharger consisting of a turbine provided in an exhaust passage and a compressor provided in an intake passage and driven by the turbine. Further, an EGR passage is placed between a downstream side of the turbine in the exhaust passage and an upstream side of the compressor in the intake passage and an EGR valve is provided in the EGR passage (a low-pressure loop type EGR apparatus).

The above type of the engine has a relatively long path of the intake passage from an outlet of the EGR passage to a throttle valve. During deceleration of the engine, therefore, as shown in FIG. 25A, even a throttle opening degree (position) is closed to a fully closed position (time t1) and the EGR valve is immediately closed in sync with rapid reduction of a request EGR rate, a large amount of EGR gas is apt to stay in the intake passage between the outlet of the EGR passage and the throttle valve. Thus, such residual EGR gas is mixed in intake air, causing a delay in decreasing an EGR rate from the start of engine deceleration (EGR attenuation delay) as shown in FIG. 25B. As a result, the EGR rate in the intake air taken in the combustion chamber becomes excessive and misfire of the engine during deceleration may be caused. This shows a tendency that as the engine is decelerated from a higher supercharged pressure or as an engine rotation speed becomes lower, the time of EGR attenuation delay is longer. FIGS. 25A and 25B are time charts respectively showing behaviors of a throttle opening degree and EGR rate before and after engine deceleration.

Therefore, the engine disclosed in JP-A-2012-7547 is provided with a fresh-air bypass passage for introducing fresh air into an intake passage downstream of the throttle valve and a bypass valve placed in the fresh-air bypass passage. This engine is configured to control the bypass valve to an opening side and the throttle valve to a closing side when the request EGR rate of the engine rapidly decreases. Accordingly, in the case where the request EGR rate rapidly decreases at the time of engine deceleration, fresh air is introduced from the fresh-air bypass passage to the intake passage, thereby scavenging EGR gas remaining in the intake passage and mixing the EGR gas flowing in the intake passage downstream of the throttle valve with fresh air to early attenuate the EGR rate.

SUMMARY OF INVENTION

Problems to be Solved by the Invention

According to the engine disclosed in JP-A-2012-7547, the EGR rate can be early attenuated during engine deceleration. However, fresh air is simply introduced in the intake passage and thus, when fuel is not cut off during deceleration, combustion pressure in the combustion chamber is increased due to the fresh air, causing an increase in engine output power. This may lead to deterioration under deceleration property of the engine. It is therefore demanded to scavenge residual EGR gas while restraining the increase in engine output power during engine deceleration and also promptly attenuating the EGR rate. In particular, in the case where high EGR is supposed, in which the EGR gas remaining in the intake passage during engine deceleration increases, the above demand is increased.

The present invention has been made in view of the above circumstances and has a purpose to provide a control apparatus for an engine capable of scavenging of residual EGR gas and promptly attenuating an EGR rate while restraining an increase in engine output power during engine deceleration.

Means of Solving the Problems

To achieve the above purpose, one aspect of the invention provides a control apparatus for an engine, including: a supercharger placed between an intake passage and an exhaust passage of an engine and configured to increase pressure of intake air in the intake passage, the supercharger including: a compressor placed in the intake passage; a turbine placed in the exhaust passage, and a rotary shaft connecting the compressor and the turbine so that they are integrally rotatable; an intake-air amount regulating valve to regulate an amount of the intake air flowing in the intake passage; an exhaust gas recirculation apparatus including an exhaust gas recirculation passage to allow part of exhaust gas discharged from a combustion chamber of the engine to the exhaust passage to flow as exhaust recirculation gas to the intake passage and recirculate back to the combustion chamber, and an exhaust gas recirculation valve to regulate a flow of the exhaust recirculation gas in the exhaust gas recirculation passage, the exhaust gas recirculation passage having an inlet connected to the exhaust passage downstream from the turbine and an outlet connected to the intake passage upstream from the compressor; a fresh-air introduction passage to introduce fresh air or quasi-fresh air to the intake passage downstream from the intake-air amount regulating valve; a fresh-air amount regulating valve to regulate an amount of the fresh air or an amount of the quasi-fresh air flowing in the fresh-air introduction passage; a fuel supply unit to supply fuel to the combustion chamber; an ignition unit to ignite an air-fuel mixture of fuel and air to be supplied to the combustion chamber; and an operating condition detection unit to detect an operating condition of the engine; wherein the control apparatus further includes an at-deceleration scavenging control unit configured to execute at-deceleration scavenging control when it is determined that the engine is under deceleration based on detection of the operating condition detecting unit and under fuel supply using the fuel supply unit, the at-deceleration scavenging control including closing the intake-air amount regulating valve to a predetermined opening degree and opening the fresh-air amount regulating valve to a predetermined opening degree to scavenge exhaust recirculation gas flowing from the exhaust gas recirculation passage to the intake passage and remaining in the intake passage, and causing the ignition unit to retard the ignition timing to reduce combustion pressure of the air-fuel mixture in the combustion chamber.

Effects of the Invention

According to the present invention, it is possible to scavenge residual EGR gas while restraining an increase in engine output power during engine deceleration and promptly attenuate a ratio of residual exhaust gas in intake air.

DESCRIPTION OF EMBODIMENTS

First Embodiment

A detailed description of a preferred first embodiment of a control apparatus for an engine of the present invention will now be given referring to the accompanying drawings.

Figure 1:
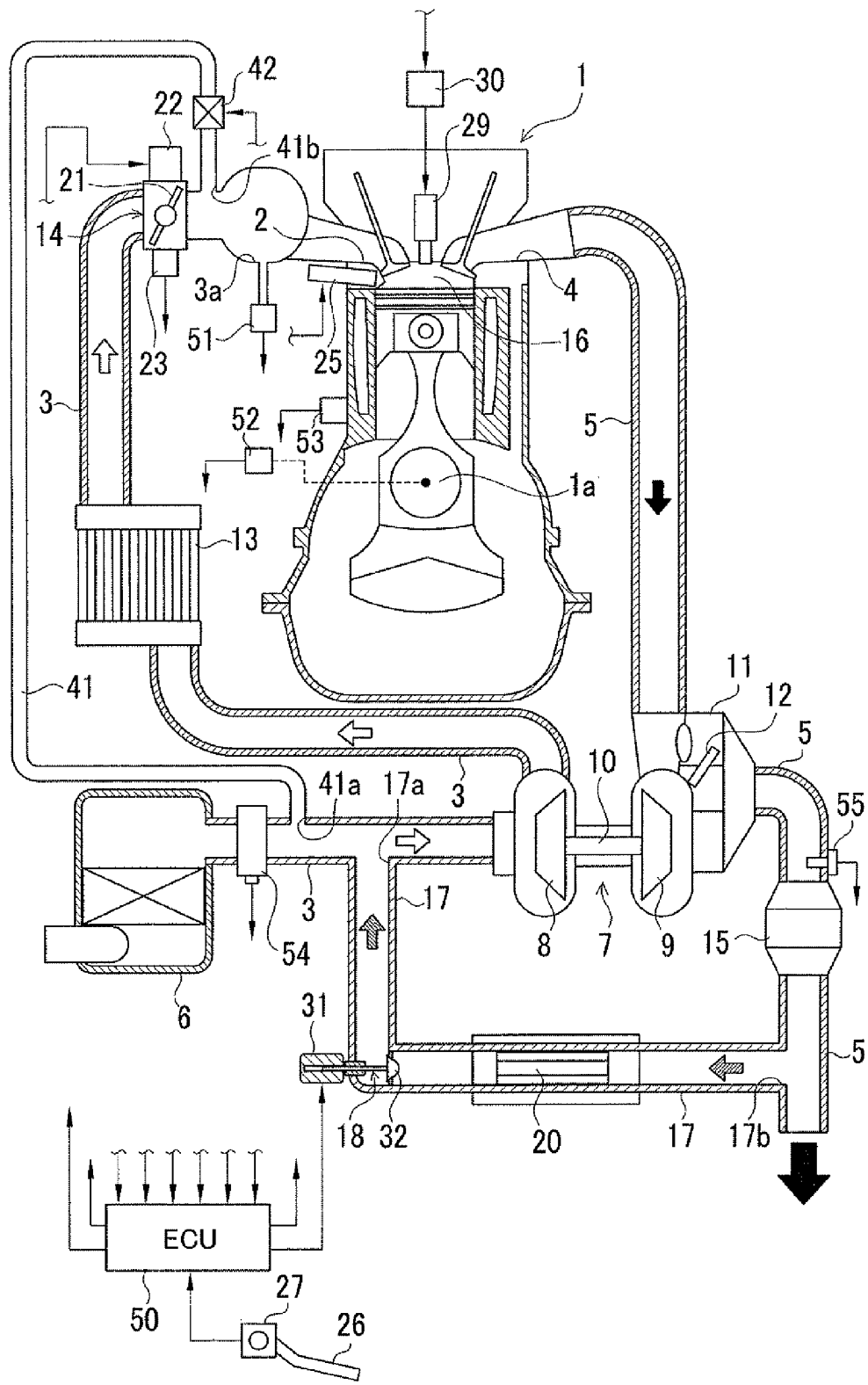
FIG. 1 is a schematic configuration view showing a supercharger-equipped engine system including an EGR apparatus of an engine in a first embodiment.

FIG. 1 is a schematic configuration view showing a supercharger-equipped engine system including an exhaust gas recirculation apparatus (EGR apparatus) of an engine in the present embodiment. This engine system includes a reciprocating-type engine 1. This engine 1 has an intake port 2 connected to an intake passage 3 and an exhaust port 4 connected to an exhaust passage 5. An air cleaner 6 is provided at an inlet of the intake passage 3. In the intake passage 3 downstream from the air cleaner 6, a supercharger 7 is placed in a position between a portion of the intake passage 3 and a portion of the exhaust passage 5 to increase the pressure of intake air in the intake passage 3.

The supercharger 7 includes a compressor 8 placed in the intake passage 3, a turbine 9 placed in the exhaust passage 5, and a rotary shaft 10 connecting the compressor 8 and the turbine 9 so that they are integrally rotatable. The supercharger 7 is configured to rotate the turbine 9 with exhaust gas flowing in the exhaust passage 5 and integrally rotate the compressor 8 through the rotary shaft 10 in order to increase the pressure of intake air in the intake passage 3, that is, carry out supercharging.

In the exhaust passage 5, adjacent to the supercharger 7, an exhaust bypass passage 11 is provided by detouring around the turbine 9. In this exhaust bypass passage 11, a waste gate valve 12 is placed. This waste gate valve 12 regulates exhaust gas allowed to flow in the exhaust bypass passage 11. Thus, a flow rate of exhaust gas to be supplied to the turbine 9 is regulated, thereby controlling the rotary speeds of the turbine 9 and the compressor 8, and adjusting supercharging pressure of the supercharger 7.

In the intake passage 3, an intercooler 13 is provided between the compressor 8 of the supercharger 7 and the engine 1. This intercooler 13 serves to cool intake air having the pressure increased by the compressor 8 and hence a high temperature, down to an appropriate temperature. A surge tank 3a is provided in the intake passage 3 between the intercooler 13 and the engine 1. Further, an electronic throttle device 14 that is an electrically-operated throttle valve is placed downstream from the intercooler 13 but upstream from the surge tank 3a. This throttle device 14 which is one example of an intake-air amount regulating valve of the invention includes a butterfly-shaped throttle valve 21 placed in the intake passage 3, a step motor 22 to drive the throttle valve 21 to open and close, and a throttle sensor 23 to detect an opening degree (a throttle opening degree) TA of the throttle valve 21. This throttle device 14 is configured so that the throttle valve 21 is driven by the step motor 22 to open and close according to operation of an accelerator pedal 26 by a driver to adjust the opening degree. The configuration of this throttle device 14 can be provided by for example a basic configuration of a "throttle device" disclosed in JP-A-2011-252482, FIGS. 1 and 2. In the exhaust passage 5 downstream from the turbine 9, a catalytic converter 15 is provided as an exhaust catalyst to clean exhaust gas.

The engine 1 is further provided with an injector 25 to inject and supply fuel into a combustion chamber 16. The injector 25 is configured to be supplied with the fuel from a fuel tank (not shown). The injector 25 is one example of a fuel supply unit of the invention. The engine 1 is further provided with ignition plugs 29. Each ignition plug 29 ignites in response to high voltage output from an igniter 30. An ignition timing of each ignition plug 29 is determined by output timing of the high voltage from the igniter 30. The ignition plug 29 and the igniter 30 constitute an ignition device as an ignition unit of the invention.

In the present embodiment, the EGR apparatus to enable high EGR includes an exhaust gas recirculation (EGR) passage 17 allowing part of exhaust gas discharged from the combustion chamber 16 of the engine 1 to the exhaust passage 5 to flow in the intake passage 3 and recirculate back to the combustion chamber 16, and an exhaust gas recirculation (EGR) valve 18 placed in the EGR passage 17 to regulate an exhaust gas flow rate (EGR flow rate) in the EGR passage 17. The EGR passage 17 is provided to extend between the exhaust passage 5 downstream from the catalytic converter 15 and the intake passage 3 upstream from the compressor 8. Specifically, an outlet 17a of the EGR passage 17 is connected to the intake passage 3 upstream from the compressor 8 in order to allow a part of exhaust gas flowing in the exhaust passage 5 to flow as EGR gas into the intake passage 3 and recirculate to the combustion chamber 16. An inlet 17b of the EGR passage 17 is connected to the exhaust passage 5 downstream from the catalytic convertor 15.

In the EGR passage 17, an EGR cooler 20 is provided to cool EGR gas flowing in the EGR passage 17. In the present embodiment, the EGR valve 18 is located in the EGR passage 17 downstream from the EGR cooler 20.

Figure 2:
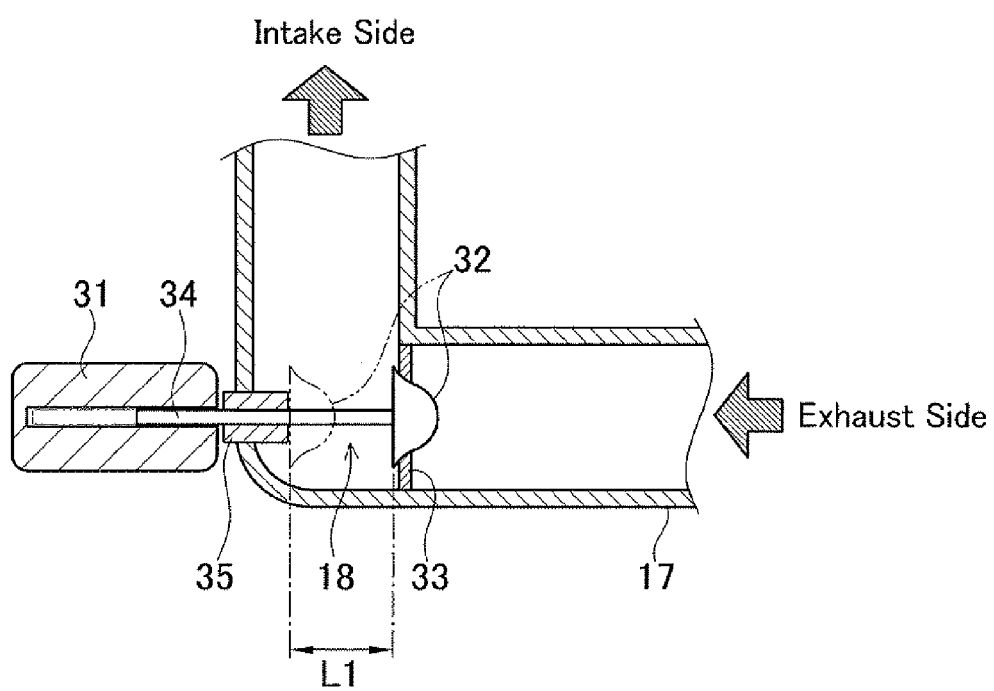
FIG. 2 is an enlarged sectional view of a part of an EGR passage in which an EGR valve is provided in the first embodiment.

FIG. 2 is a cross sectional view showing a part of the EGR passage 17 in which the EGR valve 18 is provided. As shown in FIGS. 1 and 2, the EGR valve 18 is configured as a poppet valve and a motor-operated valve. Specifically, the EGR valve 18 is provided with a valve element 32 to be driven by a step motor 31. The valve element 32 has an almost conical shape and is configured to seat on a valve seat 33 provided in the EGR passage 17. The step motor 31 includes an output shaft 34 arranged to reciprocate in a straight line (stroke movement). The valve element 32 is fixed at a leading end of the output shaft 34. This output shaft 34 is supported in a housing forming the EGR passage 17 through a bearing 35. The stroke movement of the output shaft 34 of the step motor 31 is performed to adjust the opening degree of the valve element 32 with respect to the valve seat 33. The output shaft 34 of the EGR valve 18 is provided to allow stroke movement by a predetermined stroke L1 between a fully closed position in which the valve element 32 seats on the valve seat 33 and a fully opened position in which the valve element 32 contacts with the bearing 35. In the present embodiment, an opening area of the valve seat 33 is set larger than a conventional one in order to achieve high EGR. Accordingly, the valve element 32 is also designed with large size. Available as the structure of the above EGR valve 18 is, for example, a basic structure of an "EGR valve" disclosed in FIG. 1 of JP-A-2010-275941.

As shown in FIG. 1, in the present embodiment, a fresh-air introduction passage 41 is provided to introduce fresh air to the surge tank 3a located downstream from the electronic throttle valve device 14. The fresh-air introduction passage 41 has an inlet 41a connected to the intake passage 3 downstream from the air cleaner 6 but upstream from the outlet 17a of the EGR passage 17 and an outlet 41b connected to the intake passage 3 downstream from the electronic throttle valve device 14. At a certain place in the fresh-air introduction passage 41, there is provided a fresh-air control valve 42 that is a motor-operated valve which is one example of a fresh-air flow rate regulating valve of the invention. The fresh-air control valve 42 is configured to drive a valve element by a solenoid to control an opening degree or position of the valve element with respect to a valve seat. By control of the opening degree of the fresh-air control valve 42, a flow rate of fresh air allowed to flow in the surge tank 3a from the fresh-air introduction passage 41 is regulated.

In the present embodiment, to separately execute fuel injection control, ignition timing control, intake-air amount control, EGR control, fresh-air flow rate control, and others according to an operating condition of the engine 1, an electronic control apparatus (ECU) 50 controls each of the injector 25, the igniter 30, the step motor 22 of the electronic throttle valve device 14, the step motor 31 of the EGR valve 18, and the fresh-air control valve 42 according to the operating condition of the engine 1. The ECU 50 includes a central processing unit (CPU), various memories that previously store a predetermined control program and others or temporarily store calculation results and others of the CPU, and an external input circuit and an external output circuit connected to each of them. The ECU 50 is one example of the at-deceleration scavenging control unit, at-idle scavenging control unit, abnormality determination unit, closing-control inhibiting unit, and closing-control executing unit of the invention. To the external output circuit, there are connected the igniter 30, the injector 25, each of the step motors 22 and 31, and the fresh-air control valve 42. To the external input circuit, there are connected the throttle sensor 23 and various sensors 27 and 51-55 which are one example of an operating condition detection unit of the invention to detect the operating condition of the engine 1 and transmit various engine signals to the external input circuit.

The various sensors provided in the present embodiment include the accelerator sensor 27, the intake pressure sensor 51, the rotational speed sensor 52, the water temperature sensor 53, the air flow meter 54, and the air-fuel ratio sensor 55 as well as the throttle sensor 23. The accelerator sensor 27 detects an accelerator opening degree ACC corresponding to an operation amount of the accelerator pedal 26. This accelerator pedal 26 is one example of an operating unit to control the operation of the engine 1. The intake pressure sensor 51 detects intake pressure PM in the surge tank 3a. That is, the intake pressure sensor 51 is one example of an intake pressure detection unit to detect the intake-air pressure PM in the intake passage 3 (the surge tank 3a) on the downstream side from a position at which EGR gas flows from the EGR passage 17 to the intake passage 3. The rotational speed sensor 52 detects the rotation angle (crank angle) of a crank shaft 1a of the engine 1 and also detects changes of the crank angle as the rotational speed (engine rotation speed) NE of the engine 1. The water temperature sensor 53 detects the cooling water temperature THW of the engine 1. Specifically, the water temperature sensor 53 is one example of a temperature-state detection unit to detect the cooling water temperature THW representing the temperature state of the engine 1. The air flow meter 54 is one example of an intake-air amount measuring unit to detect an intake-air amount Ga of intake air flowing in the intake passage 3 directly downstream of the air cleaner 6. The air-fuel ratio sensor 55 is placed in the exhaust passage 5 directly upstream of the catalytic convertor 15 to detect an air-fuel ratio A/F in the exhaust gas.

In the present embodiment, the ECU 50 is arranged to control the EGR valve 18 in order to control EGR according to the operating condition of the engine 1 in the entire operating region of the engine 1. On the other hand, at the time of deceleration of the engine 1, the ECU 50 controls the EGR valve 18 to fully close to shut off the flow of EGR. During the engine deceleration, furthermore, the ECU 50 executes various engine controls which will be mentioned later under predetermined conditions.

Herein, even when the EGR valve 18 is controlled to fully close at the time of deceleration of the engine 1, EGR gas remains in a path of the intake passage 3 between the outlet 17a of the EGR passage 17 and the electronic throttle valve device 14 because it is relatively long. Further, when the residual EGR gas flows in the combustion chamber 16, misfire of the engine 1 during deceleration may be caused. In the present embodiment, therefore, the ECU 50 executes the following various controls to scavenge residual EGR gas in the intake passage 3 at the time of deceleration.

Figure 3:
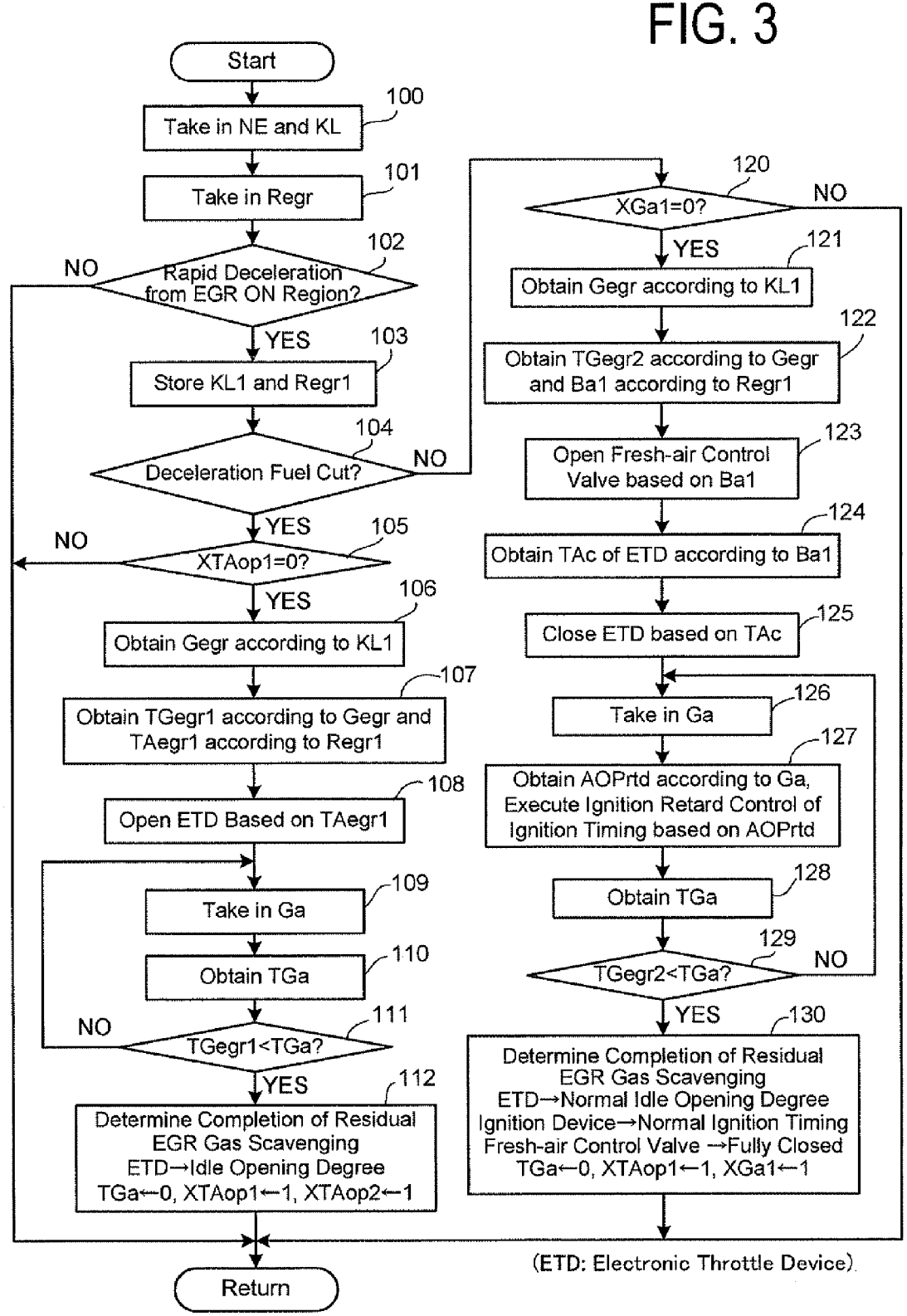
FIG. 3 is a flowchart showing one example of processing details of at-deceleration residual EGR gas scavenging control in the first embodiment.

In the present embodiment, during deceleration operation of the engine 1, the control to scavenge residual EGR gas during deceleration operation of the engine 1 (at-deceleration scavenging control of the invention) is performed. FIG. 3 is a flowchart showing one example of processing details of the at-deceleration residual EGR gas scavenging control to be executed by the ECU 50.

When the processing shifts to this routine, in Step 100, the ECU 50 first takes in an engine rotation speed NE and an engine load KL respectively based on a detection value of the rotation speed sensor 52 and a measurement value of the air flow meter 54.

In Step 101, the ECU 50 then takes in an EGR rate Regr. Herein, the EGR rate Regr means a ratio of an EGR flow rate of EGR gas flowing from the EGR passage 17 to the intake passage 3 to an amount of intake air including the EGR flow rate. This EGR rate Regr is determined by the ECU 50 according to the operating condition of the engine 1.

In Step 102, subsequently, the ECU 50 judges whether or not the operating condition of the engine 1 is in engine rapid deceleration from an EGR ON region. In other words, the ECU 50 determines whether or not the engine 1 turns from an EGR executing state to a rapidly decelerating state. The ECU 50 can make this rapid deceleration determination based on for example a change in throttle valve opening degree TA. If NO in Step 102, the ECU 50 returns the processing to Step 100. If YES in Step 102, the ECU 50 advances the processing to Step 103.

In Step 103, the ECU 50 then stores, in a memory, the engine load and the EGR rate just before deceleration as a just-before-deceleration engine load KL1 and an EGR rate Regr1 respectively.

In Step 104, the ECU 50 judges whether or not the engine 1 is under deceleration fuel cut. In other words, the ECU 50 determines whether or not the engine 1 is under deceleration and fuel supply from the injector 25 to the engine 1 is cut off. If YES in Step 104, the ECU 50 shifts the processing to Step 105. If NO in Step 104, the ECU 50 shifts the processing to Step 120.

In Step 105, the ECU 50 judges whether or not a first EGR-rate attenuation flag XTAop1 is "0". Herein, the first EGR-rate attenuation flag XTAop1 is set to "1" when attenuation of the residual EGR rate Regr 1 is completed under a deceleration fuel cut condition and set to "0" when the attenuation is not completed, as will be described later. The ECU 50 returns the processing to Step 100 if NO in Step 105 or shifts the processing to Step 106 if YES in Step 105.

Figure 4:
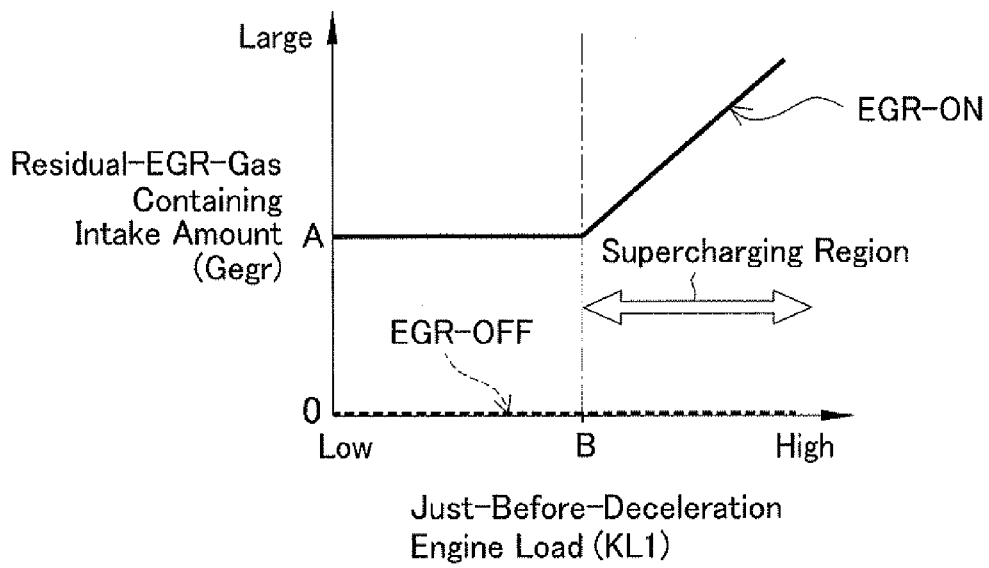
FIG. 4 is a map to be referred to in order to obtain a residual-EGR-gas containing intake-air amount in the first embodiment.

In Step 106, the ECU 50 obtains a residual-EGR-gas containing intake-air amount Gegr according to the just-before-deceleration engine load KL1. This residual-EGR-gas containing intake-air amount Gegr represents an amount of intake air containing EGR gas remaining in the intake passage 3 upstream from the electronic throttle valve device 14. The ECU 50 can obtain this residual-EGR-gas containing intake-air amount Gegr by referring to for example a previously set map as shown in FIG. 4. This map is set so that the residual-EGR-gas containing intake-air amount Gegr is constant at a predetermined value A in a range from low load to a predetermined value B of the just-before-deceleration engine load KL1 and, as this engine load KL1 is larger than the predetermined value B, the intake-air amount Gegr is linearly larger. The range where the engine load KL1 is larger than the predetermined value B corresponds to a supercharging region to perform supercharging.

Figure 5:
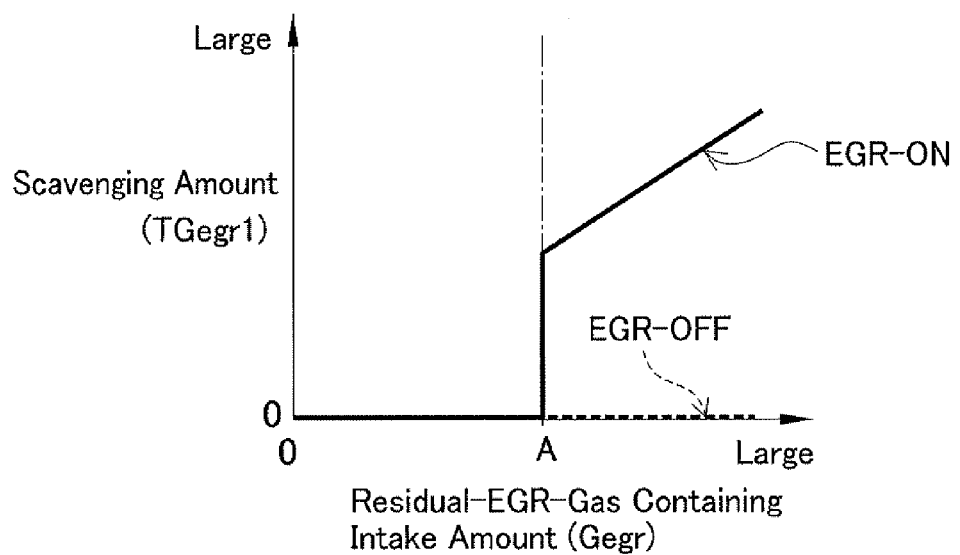
FIG. 5 is a map to be referred to in order to obtain a scavenging amount in the first embodiment.
Figure 6:
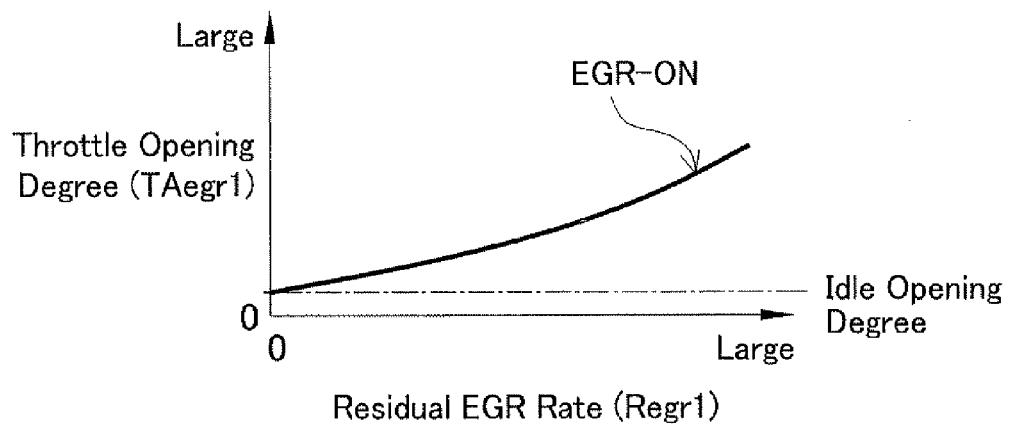
FIG. 6 is a map to be referred to in order to obtain a throttle valve opening degree in the first embodiment.

In Step 107, thereafter, the ECU 50 obtains respectively a scavenging amount TGegr1 according to the residual-EGR-gas containing intake-air amount Gegr and a throttle valve opening degree TAegr1 according to a residual EGR rate Regr1 just before deceleration. The ECU 50 can obtain this scavenging amount TGegr1 by referring to for example a previously set map as shown in FIG. 5. This map is set so that the scavenging amount TGegr1 is constant at "0" in a range of the residual-EGR-gas containing intake-air amount Gegr from "0" to a predetermined value A and, as this intake-air amount Gegr is larger than the predetermined value A, the scavenging amount TGegr1 sharply increases and then linearly increases. The ECU 50 can obtain this throttle valve opening degree TAegr1 by referring to for example a previously set map as shown in FIG. 6. This map is set so that the throttle valve opening degree TAegr1 gradually increases as the residual EGR rate Regr1 increases from "0".

In Step 108, the ECU 50 opens a valve of the electronic throttle valve device 14 based on the obtained throttle valve opening degree TAegr1.

In Step 109, the ECU 50 takes in an intake-air amount Ga based on a measurement value of the air flow meter 54.

In Step 110, the ECU 50 obtains an accumulated (integrated) intake-air amount TGa. The ECU 50 calculates a current accumulated intake-air amount TGab by adding a currently taken intake-air amount Ga to a previously obtained accumulated intake-air amount TGa.

In Step 111, the ECU 50 judges whether or not the scavenging amount TGegr1 according to the residual-EGR-gas containing intake-air amount Gegr is larger than the accumulated intake-air amount TGa. If NO in Step 111, the ECU 50 returns the processing to Step 109 and repeats the processing in Steps 109 to 111. By this repetition, the ECU 50 waits until the accumulated intake-air amount TGa becomes larger than the scavenging amount TGegr1, that is, until scavenging of the residual EGR gas is completed. If YES in Step 111, the ECU 50 shifts the processing to Step 112.

In Step 112, the ECU 50 determines that the scavenging of the residual EGR gas is completed, controls the throttle valve 21 of the electronic throttle valve device 14 to a predetermined idle opening degree, sets the accumulated intake-air amount TGa to "0", respectively sets the first EGR rate attenuation flag XTAop1 and a second EGR rate attenuation flag XTAop2 to "1", and returns the processing to Step 100.

On the other hand, in the case where the engine 1 is in the rapid deceleration condition where fuel cut is not performed, the ECU 50 shifts the processing from Step 104 to Step 120 to judge whether or not the fresh-air introduction flag XGa1 is "0". In the present embodiment, the fresh-air introduction flag XGa1 is set to "1" if fresh air is introduced to the surge tank 3*a* through the fresh-air introduction passage 41 or set to "0" if fresh air is not introduced. The ECU 50 returns the processing to Step 100 if NO in Step 120 or shifts the processing to Step 121 if YES in Step 120.

In Step 121, the ECU 50 then obtains the residual-EGR-gas containing intake-air amount Gegr according to the just-before-deceleration engine load KL1. The ECU 50 can obtain the residual-EGR-gas containing intake-air amount Gegr by referring to for example the previously set map as shown in FIG. 4.

Figure 7:
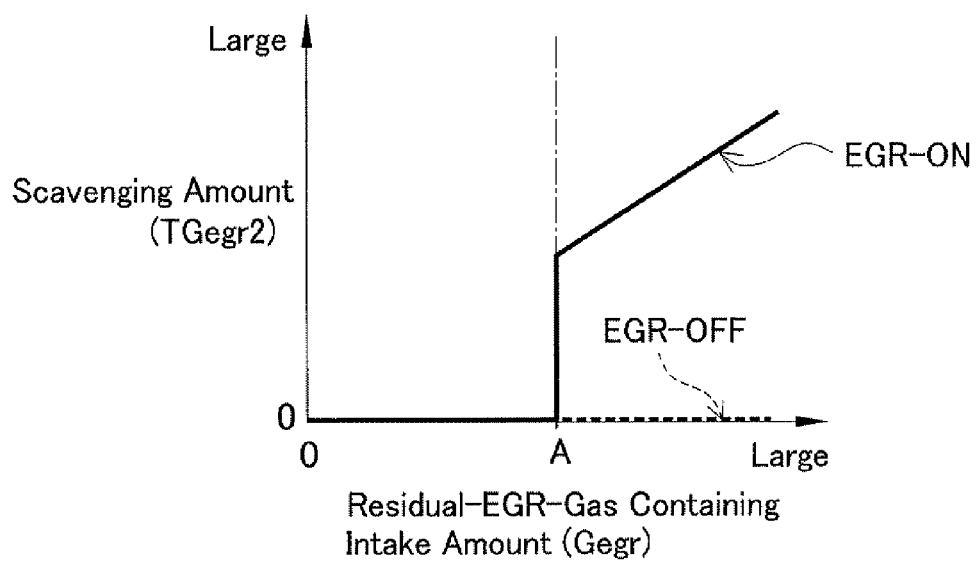
FIG. 7 is a map to be referred to in order to obtain another scavenging amount in the first embodiment.
Figure 8:
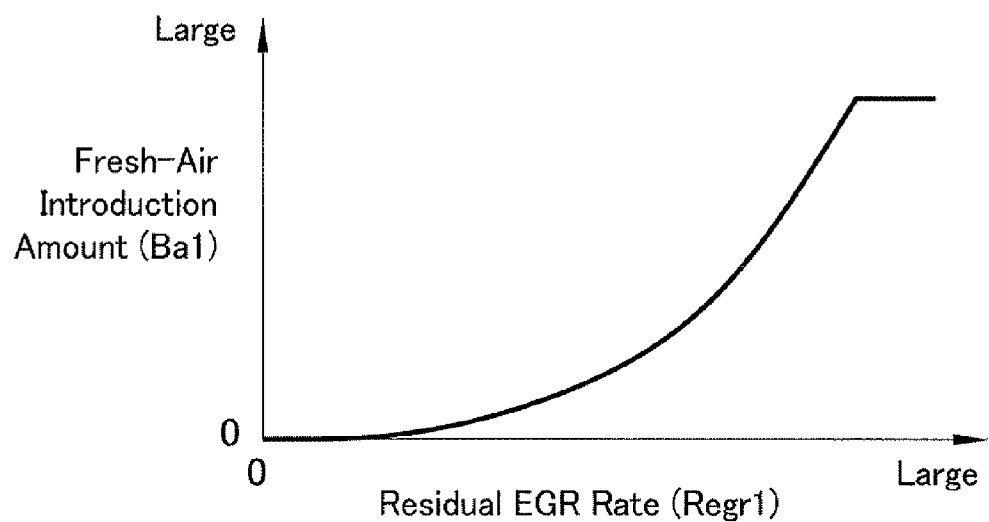
FIG. 8 is a map to be referred to in order to obtain a fresh-air introducing amount in the first embodiment.

In Step 122, the ECU 50 respectively obtains a scavenging amount TGegr2 according to the residual-EGR-gas containing intake-air amount Gegr and a fresh-air introduction amount Ba1 according to the residual EGR rate Regr1. The ECU 50 can obtain this scavenging amount TGegr2 by referring to for example a previously set map as shown in FIG. 7. This map is set so that the scavenging amount TGegr2 corresponds to the map of FIG. 5 with respect to the residual-EGR-gas containing intake-air amount Gegr. The ECU 50 can also obtain the above fresh-air introduction amount Ba1 by referring to for example a previously set map as shown in FIG. 8. This map is set so that the fresh-air introduction amount Ba1 increases in a curve up to an upper limit as the residual EGR rate Regr1 increases.

In Step 123, the ECU 50 opens the fresh-air control valve 42 based on the obtained fresh-air introduction amount Ba1.

Figure 9:
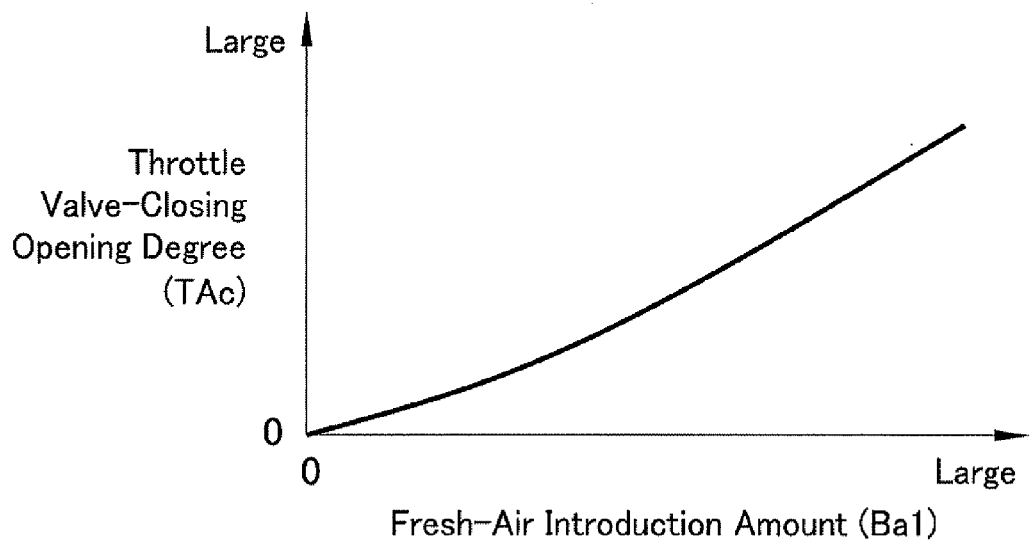
FIG. 9 is a map to be referred to in order to obtain a valve-closing opening degree in the first embodiment.

In Step 124, the ECU 50 then obtains a valve-closing opening degree TAc of the electronic throttle valve device 14 (the throttle valve 21) according to the obtained fresh-air introduction amount Ba1. The ECU 50 can obtain this valve-closing opening degree TAc by referring to for example a previously set map as shown in FIG. 9. This map is set so that the valve-closing opening degree TAc almost linearly increases as the fresh-air introduction amount Ba1 becomes larger. Herein, the valve-closing opening degree TAc represents an opening degree of the throttle valve 21 slightly opened in a substantially closed position, not fully closed.

In Step 125, the ECU 50 closes the electronic throttle valve device 14 based on the obtained valve-closing opening degree TAc. Specifically, the ECU 50 narrows down the opening degree of the throttle valve 21 moderately according to the fresh-air introduction amount Ba1 provided by the fresh-air control valve 42.

In Step 126, thereafter, the ECU 50 takes in the intake-air amount Ga based on a measurement value of the air flow meter 54.

In Step 127, the ECU 50 obtains an ignition retard amount AOPrtd of an ignition timing according to the intake-air amount Ga and then executes ignition retard control of the ignition timing based on the ignition retard amount AOPrtd. This ignition retard control is configured to retard the ignition timing than a normal ignition timing to reduce combustion pressure of an air-fuel mixture increased due to excessive air taken in the combustion chamber 16.

In Step 128, the ECU 50 obtains the accumulated intake-air amount TGa. The ECU 50 calculates this accumulated intake-air amount TGa by adding a currently taken intake-air amount Ga to a previously obtained accumulated intake-air amount TGa.

In Step 129, the ECU 50 judges whether or not the accumulated intake-air amount TGa is larger than the scavenging amount TGegr2 according to the residual-EGR-gas containing intake-air amount Gegr. If NO in Step 129, the ECU 50 returns the processing to Step 126 and repeats the processing in Steps 126 to 129. By this repetition, the ECU 50 waits until the accumulated intake-air amount TGa becomes larger than the scavenging amount TGegr2, that is, until scavenging of the residual EGR gas is completed. If YES in Step 129, the ECU 50 shifts the processing to Step 130.

In Step 130, the ECU 50 determines that the scavenging of the residual EGR gas is completed and returns the electronic throttle valve device 14 (the throttle valve 21) to a normal idle opening degree, returns the ignition device to a normal ignition timing, and fully closes the fresh-air control valve 42. The ECU 50 further sets the accumulated intake-air amount TGa to "0", sets the first EGR rate attenuation flag XTAop1 to "1", and the fresh-air introduction flag XGa1 to "1", respectively, and returns the processing to Step 100.

According to the above control in the present embodiment, when the ECU 50 determines that the engine 1 is being decelerated, i.e., under deceleration, and is being supplied with fuel, i.e., under fuel supply, through the injector 25, that is, during engine deceleration where fuel cut is not performed, the ECU 50 closes the electronic throttle valve device 14 to a predetermined valve-closing opening degree TAc and opens the fresh-air control valve 42 to a predetermined opening degree in order to scavenge EGR gas flowing from the EGR passage 17 to the intake passage 3 and remaining in the intake passage 3. To reduce combustion pressure of the air-fuel mixture in the combustion chamber 16, the at-deceleration residual EGR gas scavenging control is executed to retard the ignition timing by the igniter 30 and the ignition plug 29. Accordingly, by this scavenging control, the electronic throttle device 14 is closed to a predetermined valve-closing opening degree TAc, thereby allowing the EGR gas remaining in the intake passage 3 upstream from the electronic throttle device 14 to gradually flow to the surge tank 3a downstream from the electronic throttle device 14 and be scavenged. Further, the fresh-air control valve 42 is opened to the predetermined opening degree, so that the residual EGR gas flowing in the surge tank 3a is mixed with fresh air, thereby attenuating the ratio of EGR gas in intake air (the residual EGR rate Regr1). Since the ignition timing is retarded based on the predetermined ignition retard amount AOPrtd, the combustion pressure in the combustion chamber 16 is reduced. This makes it possible to scavenge the residual EGR gas while restraining a rise in output power of the engine 1 during deceleration of the engine 1, and promptly attenuate the residual EGR rate Regr1

Herein, the ECU 50 is arranged to close the electronic throttle device 14 based on the valve-closing opening degree TAc according to the fresh-air introduction amount Ba1 regulated by opening of the fresh-air control valve 42. Thus, the total amount of the intake air containing residual EGR gas and the fresh air can be restrained from increasing. It is therefore possible to prevent an increase in amount of air to be sucked in the combustion chamber 16 and reduce an increase in combustion pressure, thereby restraining an increase in output power of the engine 1.

According to the above control, the ECU 50 is configured to obtain the ignition retard amount AOPrtd of the ignition timing according to the intake-air amount Ga of intake air flowing in the intake passage 3 from the start of the at-deceleration residual EGR gas scavenging control, and controls the igniter 30 and the ignition plug 29 to retard the ignition timing based on the obtained ignition retard amount AOPrtd. Thus, the ignition retard amount AOPrtd of the ignition timing does not become excessive with respect to the intake-air amount Ga. This can prevent misfire of the engine 1 due to excessive ignition retard of the ignition timing.

According to the above control, when the accumulation value (accumulated intake-air amount) TGa of the intake-air amount Ga flowing in the intake passage 3 from the start of scavenging of the residual EGR gas staying in the intake passage 3 becomes larger than the scavenging amount TGegr2 estimated according to the just-before-deceleration engine load KL1, the ECU 50 determines that the scavenging of the residual EGR gas is completed, and terminates the at-deceleration residual EGR gas scavenging control. Thus, the at-deceleration residual EGR gas scavenging control is not prolonged more than needed. This can prevent a returning delay from the deceleration operation of the engine 1 to the EGR control.

In the present embodiment, since the outlet 41b of the fresh-air introduction passage 41 is connected to the intake passage 3 downstream from the electronic throttle device 14, when the intake negative pressure is generated in the surge tank 3a, fresh air is caused to be introduced in that connecting portion from the outlet 41b of the fresh-air introduction passage 41 and to flow in the surge tank 3a. Since the inlet 41a of the fresh-air introduction passage 41 is connected to the intake passage 3 upstream from the outlet 17a of the EGR passage 17, furthermore, EGR gas does not flow in the inlet 41a of the fresh-air introduction passage 41 from the outlet 17a of the EGR passage 17. Accordingly, only fresh air is allowed to flow in the surge tank 3a through the fresh-air introduction passage 41.

Figure 10:
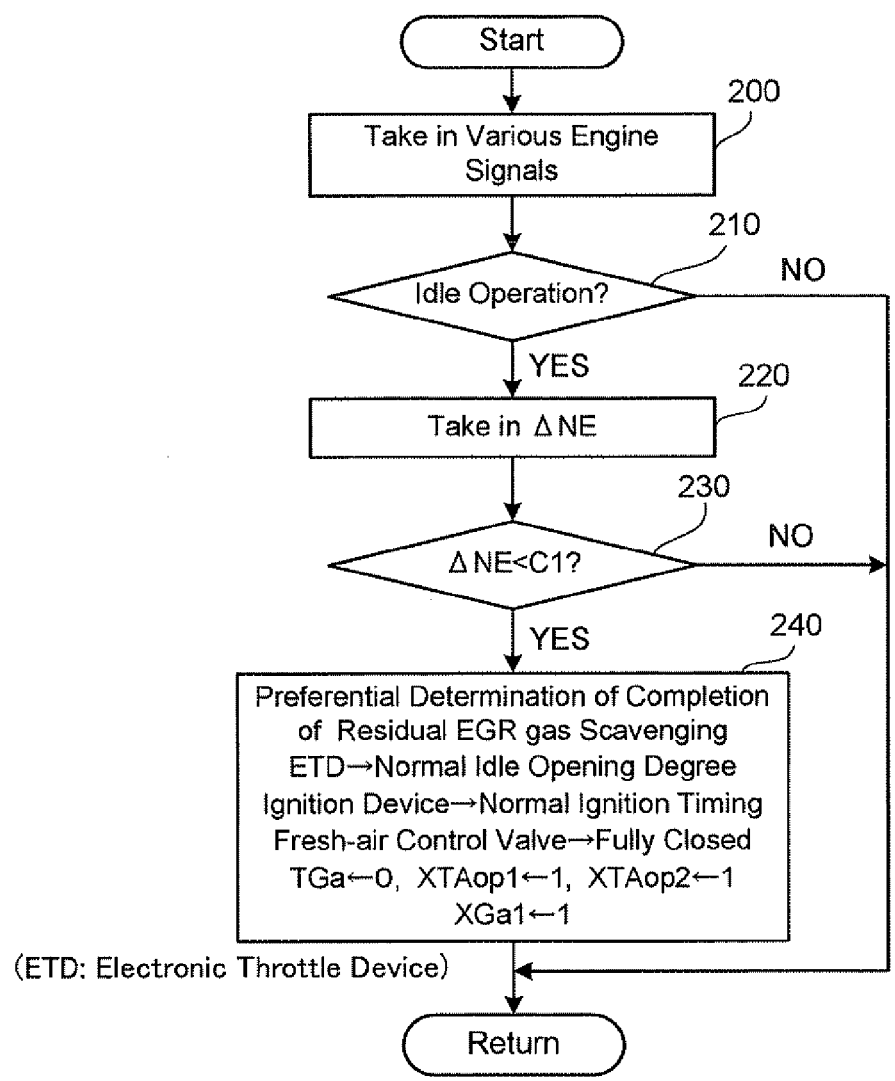
FIG. 10 is a flowchart showing one example of processing details for residual EGR-gas scavenging completion determination to be executed when deceleration operation is shifted to idle operation in the first embodiment.

The determination of scavenging completion of the residual EGR gas when the engine 1 is shifted from the deceleration operation to the idle operation will be explained below. FIG. 10 is a flowchart showing one example of processing details thereof.

When the processing shifts to this routine, in Step 200, the ECU 50 first takes in various engine signals based on detection values and others from various sensors 51-55 and others.

In Step 210, the ECU 50 then determines whether or not the engine 1 is in an idle operation. For example, the ECU 50 makes this determination based on the throttle valve opening degree TA and the engine rotation speed NE. If NO in Step 210, the ECU 50 returns the processing to Step 200. If YES in Step 210, on the other hand, the ECU 50 shifts the processing to Step 220.

In Step 220, the ECU 50 obtains an engine rotational variation ΔNE. Specifically, the ECU 50 obtains a change in engine rotation speed NE per unit time.

Figure 11:
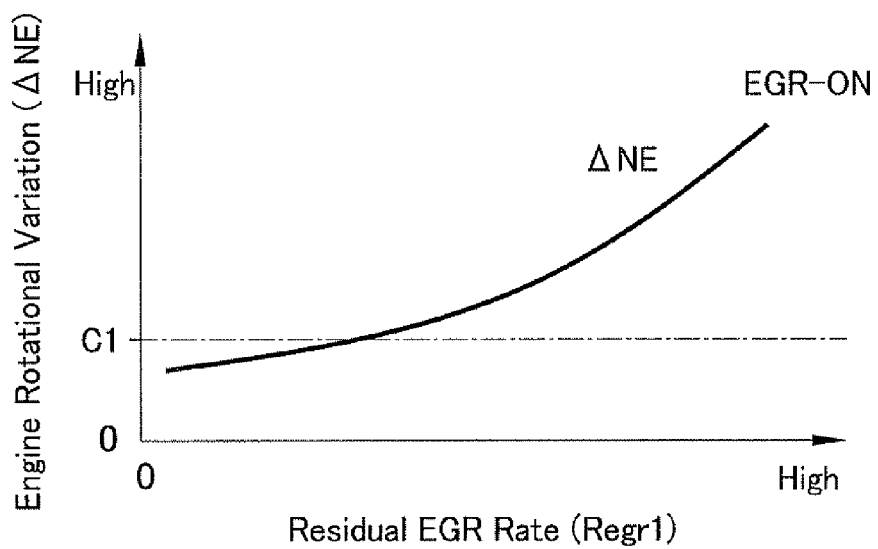
FIG. 11 is a graph showing a relationship between a residual EGR rate and an engine rotational variation in the first embodiment.

In Step 230, the ECU 50 determines whether or not the obtained engine rotational variation ΔNE is smaller than a predetermined reference value C1. FIG. 11 is a graph showing a relationship between the residual EGR rate Regr1 and the engine rotational variation ΔNE. As clearly found from this graph, when the engine rotational variation ΔNE becomes below the reference value C1, the residual EGR rate Regr1 becomes lower than the predetermined value. If NO in Step 230, the ECU 50 returns the processing to Step 200. If YES in Step 230, the ECU 50 shifts the processing to Step 240.

In Step 240, the ECU 50 preferentially determines that scavenging of the residual EGR gas is completed based on the state of the engine 1 shifted from the deceleration operation to the idle operation. In other words, it is possible to determine that the scavenging is completed even when the scavenging of the residual EGR gas is not completed in the routine in FIG. 3. The ECU 50 returns the electronic throttle device 14 (the throttle valve 21) to the normal idle opening degree, returns the ignition device to the normal ignition timing, and fully closes the fresh-air control valve 42. The ECU 50 sets the accumulated intake-air amount TGa to "0", sets the first EGR rate attenuation flag XTAop1 and the second EGR rate attenuation flag XTAop2 to "1", and sets the fresh-air introduction flag XGa1 to "1", respectively, and then returns the processing to Step 200.

According to the above control in the present embodiment, the ECU 50 is configured so that, when the engine 1 is determined to be under deceleration where fuel cut is not performed and further to be in an idle operation, it is determined that the scavenging of the residual EGR gas is completed when the engine rotational variation ΔNE becomes smaller than the predetermined reference value C1. Since the at-deceleration residual EGR gas scavenging control is terminated by this determination, the at-deceleration residual EGR gas scavenging control is not prolonged even when the idle operation is reached. Therefore, even when the engine 1 shifts from the deceleration operation to the idle operation, it is possible to properly determine the scavenging completion of residual EGR gas and thus prevent a returning delay from the idle operation to the EGR control.

Figure 12:
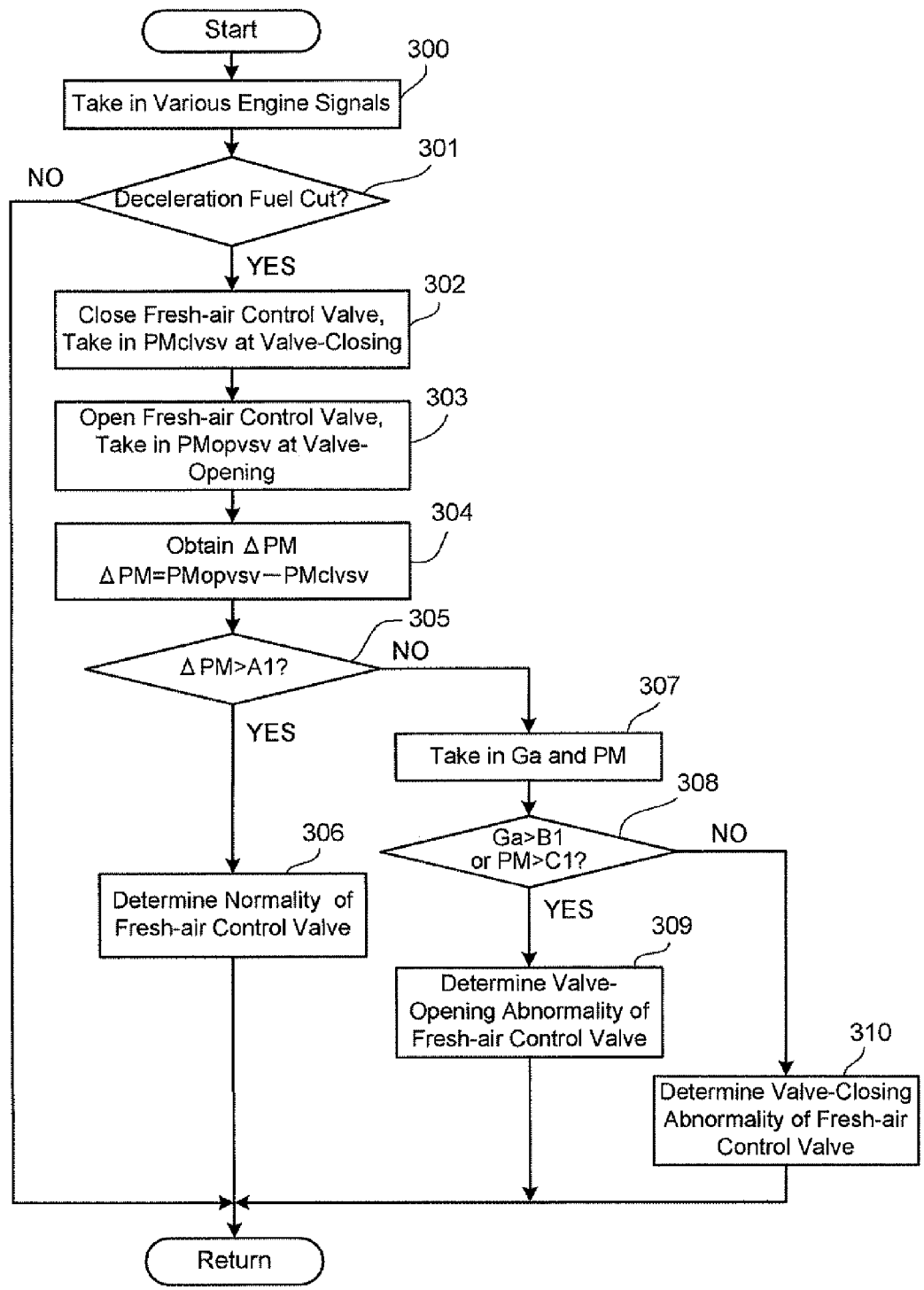
FIG. 12 is a flowchart showing one example of processing details for failure determination of a fresh-air control valve in the first embodiment.

Next, failure determination of the fresh-air control valve 42 will be described below. FIG. 12 is a flowchart showing one example of processing details thereof.

In Step 300, the ECU 50 takes in various engine signals based on detection values and others from the various sensors 51-55 and others.

In Step 301, the ECU 50 determines whether or not the operation of the engine 1 is in a deceleration fuel cut state. The ECU 50 returns the processing to Step 300 if NO in Step 301 or shifts the processing to Step 302 if YES in Step 301.

In Step 302, the ECU 50 closes the fresh-air control valve 42 and takes in the intake pressure PM at that time as intake pressure PMclvsv.

In Step 303, subsequently, the ECU 50 opens the fresh-air control valve 42 and takes in the intake pressure PM at that time as intake pressure PMopvsv.

In Step 304, the ECU 50 obtains an intake pressure variation ΔPM. The ECU 50 calculates this intake pressure variation ΔPM by subtracting the intake pressure PMclvsv obtained at the valve closing time from the intake pressure PMopvsv obtained at the valve opening time.

In Step 305, the ECU 50 determines whether or not the intake pressure variation ΔPM is larger than a predetermined reference value A1. Herein, the reference value A1 is an arbitral value effective in determination. If YES in Step 305, the ECU 50 performs normality determination in Step 306 that the fresh-air control valve 42 is normal, and then returns the processing to Step 300. In the normality determination, the ECU 50 stores a determination result thereof in the memory. On the other hand, if NO in Step 305, the ECU 50 shifts the processing to Step 307.

In Step 307, the ECU 50 takes in the intake-air amount Ga and the intake pressure PM respectively based on detection values from the air flow meter 54 and the intake pressure sensor 51.

In Step 308, the ECU 50 determines whether or not the intake-air amount Ga is larger than a predetermined reference value B1 or the intake pressure PM is larger than a predetermined reference value C1. Herein, the reference values B1 and C1 are arbitral values effective in determination.

If YES in Step 308, the ECU 50 performs, in Step 309, valve-opening abnormality determination that the fresh-air control valve 42 is in a valve opened state and is abnormal, and thus returns the processing to Step 300. In the valve-opening abnormality determination, the ECU 50 stores a determination result in the memory. On the other hand, if NO in Step 308, the ECU 50 executes valve-closing abnormality determination in Step 310 that the fresh-air control valve 42 is in a valve closed state and is abnormal, and thus returns the processing to Step 300. In the valve-closing abnormality determination, the ECU 50 stores a determination result thereof in the memory.

According to the above control in the present embodiment, the ECU 50 is configured so that, when it is determined that the engine 1 is under deceleration and is not under fuel supply using the injector 25, that is, the engine 1 is in a deceleration fuel cut state, the ECU 50 determines normality and abnormality of the fresh-air control valve 42 based on a change in intake pressure PM in the intake passage 3, a magnitude of the intake pressure PM, and a magnitude of the intake-air amount Ga in the intake passage 3 when the fresh-air control valve 42 is opened from the valve closing state. Accordingly, it is possible to deal with the abnormality of the fresh-air control valve 42 before the fresh-air control valve 42 is operated. This can avoid an erroneous operation of the fresh-air control valve 42. The abnormality determination of the fresh-air control valve 42 is performed at the time of the deceleration fuel cut, so that the influence of abnormality determination on output power of the engine 1 can be avoided.

Figure 13:
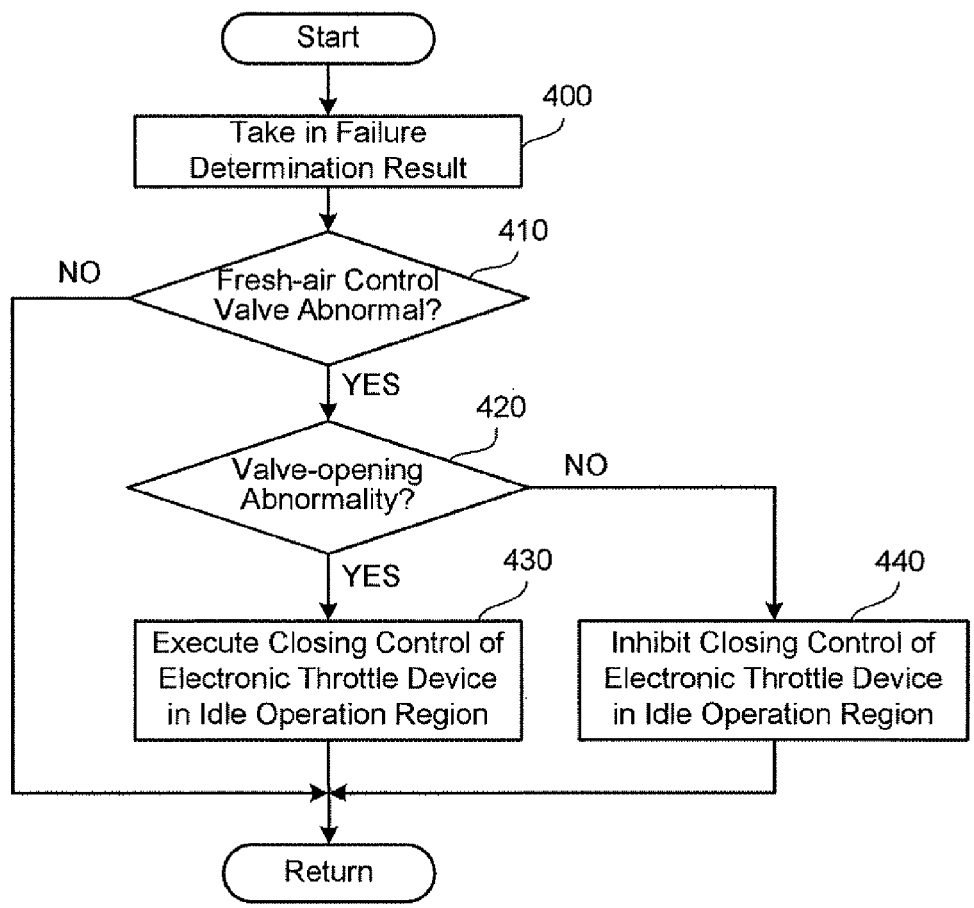
FIG. 13 is a flowchart showing one example of processing details for fail-safe control in response to the failure determination of the fresh-air control valve in the first embodiment.

The fail-safe control to be executed in response to the failure determination of the fresh-air control valve 42 mentioned above will be described below. FIG. 13 is a flowchart showing one example of processing details thereof.

The ECU 50 first takes in a failure determination result of the fresh-air control valve 42 in Step 400 and determines whether or not the fresh-air control valve 42 is abnormal based on the failure determination result in Step 410. The ECU 50 returns the processing to Step 400 if NO in Step 410 or shifts the processing to Step 420 if YES in Step 410.

In Step 420, the ECU 50 determines whether or not the fresh-air control valve 42 is abnormal in valve opening based on the failure determination result. If YES in Step 420, the ECU 50 executes, in Step 430, closing control of the electronic throttle device 14 in an idle operation region of the engine 1. Specifically, when the fresh-air control valve 42 is broken as remaining open, a sufficient amount of fresh air is allowed to flow in the surge tank 3a through the fresh-air introduction passage 41. Thus, the electronic throttle device 14 is subjected to the closing control in order to prevent the air from becoming sucked any more in the combustion chamber 16.

On the other hand, if NO in Step 420, showing that valve-closing abnormality, the ECU 50 inhibits, in Step 440, the closing control of the electronic throttle device 14 in the idle operation region of the engine 1. Specifically, while the fresh-air control valve 42 is broken, or out of action, as remaining closed, fresh air is not allowed to flow in the surge tank 3a through the fresh-air introduction passage 41. Thus, the closing control of the electronic throttle device 14 is inhibited to allow an amount of air needed for idle operation to be sucked in the combustion chamber 16.

According to the above control in the present embodiment, when the ECU 50 determines that the fresh-air control valve 42 is in a valve-opening abnormal state where the valve 42 is out of action as remaining opened, the ECU 50 executes the closing control of the electronic throttle device 14 in the idle operation region of the engine 1. Accordingly, in a state where a sufficient amount of fresh air is allowed to flow in the surge tank 3a through the fresh-air introduction passage 41, a flow of intake air in the intake passage 3 is shut off by the electronic throttle device 14, and thus the air is not sucked more than necessary in the combustion chamber 16. Therefore, it is possible to deal with the valve-opening abnormality of the fresh-air control valve 42 and restrain an unexpected rise in idle rotation speed, thereby preventing deterioration in deceleration property of the engine 1.

According to the above control, when the ECU 50 determines that the fresh-air control valve 42 is in a valve-closing abnormal state where the valve 42 is out of action as remaining closed, the ECU 50 inhibits the closing control of the electronic throttle device 14 in the idle operation region of the engine 1. Accordingly, in a state where fresh air is not allowed to flow in the surge tank 3a through the fresh-air introduction passage 41, a flow of intake air in the intake passage 3 is ensured by the electronic throttle device 14, thus ensuring suction of air in the combustion chamber 16. Consequently, it is possible to deal with the valve-closing abnormality of the fresh-air control valve 42 and prevent unexpected decrease in output power of the engine 1 and engine stall.

Second Embodiment

A second embodiment embodying a control apparatus for an engine according to the invention will be described in detail below referring to the accompanying drawings.

In each of the following embodiments, similar or identical parts to those in the first embodiment are given the same reference signs and their explanations are not repeated. The following explanation is thus made with a focus on differences from the first embodiment.

Figure 14:
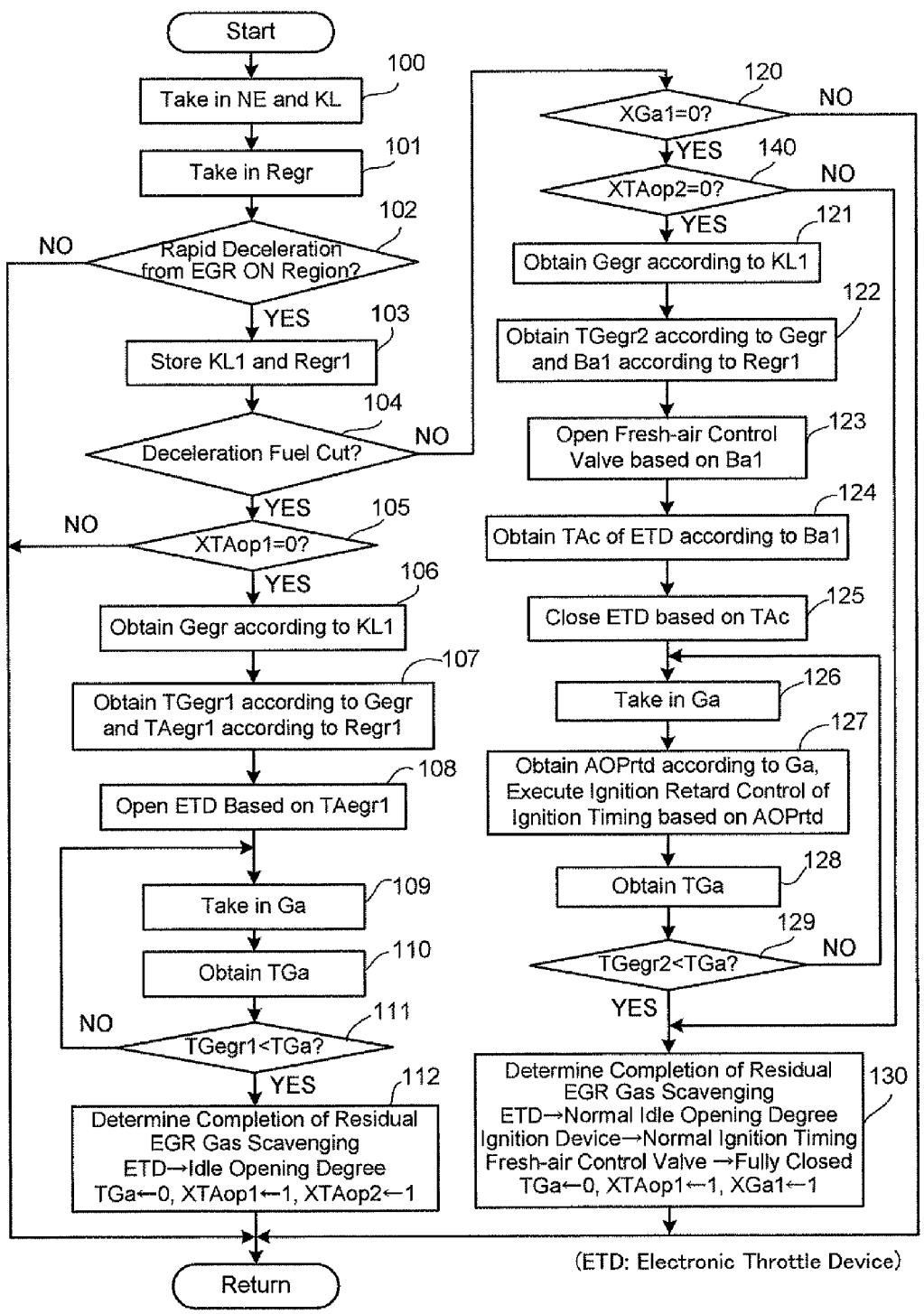
FIG. 14 is a flowchart showing one example of processing details of at-deceleration residual EGR gas scavenging control in a second embodiment.

This second embodiment differs from the first embodiment in the at-deceleration residual EGR gas scavenging control and related control thereto. FIG. 14 is a flowchart showing one example of processing details of the at-deceleration residual EGR gas scavenging control in the present embodiment.

In the present embodiment, the processing in Step 140 is added between the Step 120 and the Step 121 of the flowchart of FIG. 14. This is a difference from the processings of the flowchart of FIG. 3 in the first embodiment.

Specifically, when the fresh-air introduction flag XGa1 is determined to be "0" in Step 120, that is, when it is determined that fresh air is not introduced in the surge tank 3a, the ECU 50 shifts the processing to Step 140 to determine whether or not the second EGR rate attenuation flag XTAop2 is "0". Herein, the second EGR rate attenuation flag XTAop2 is set to "1" when the residual EGR rate Regr1 is completely attenuated and set to "0" when the attenuation is not completed under a deceleration operation condition where fuel cut is not performed. If NO in Step 140, the ECU 50 shifts the processing to Step 130. If YES in Step 140, the ECU 50 shifts the processing to Step 121.

in Step 130 following Step 140, the ECU 50 determines that the scavenging of the residual EGR gas is completed and returns the electronic throttle device 14 (the throttle valve 21) to the normal idle opening degree, returns the ignition device to the normal ignition timing, and places the fresh-air control valve 42 to a fully closed position. Further, the ECU 50 sets the accumulated intake-air amount TGa to "0", sets the first EGR rate attenuation flag XTAop1 to "1", sets the fresh-air introduction flag XGa1 to "1", respectively, and then returns the processing to Step 100.

In Step 121 following Step 140, on the other hand, the ECU 50 obtains the residual-EGR-gas containing intake-air amount Gegr according to the just-before-deceleration engine load KL1 in a similar manner to the above.

Remaining Steps 100-112, and 122-129 in the flowchart of FIG. 14 are the same as those in the flowchart of FIG. 3. Thus, their explanations are not repeated herein.

Figure 15:
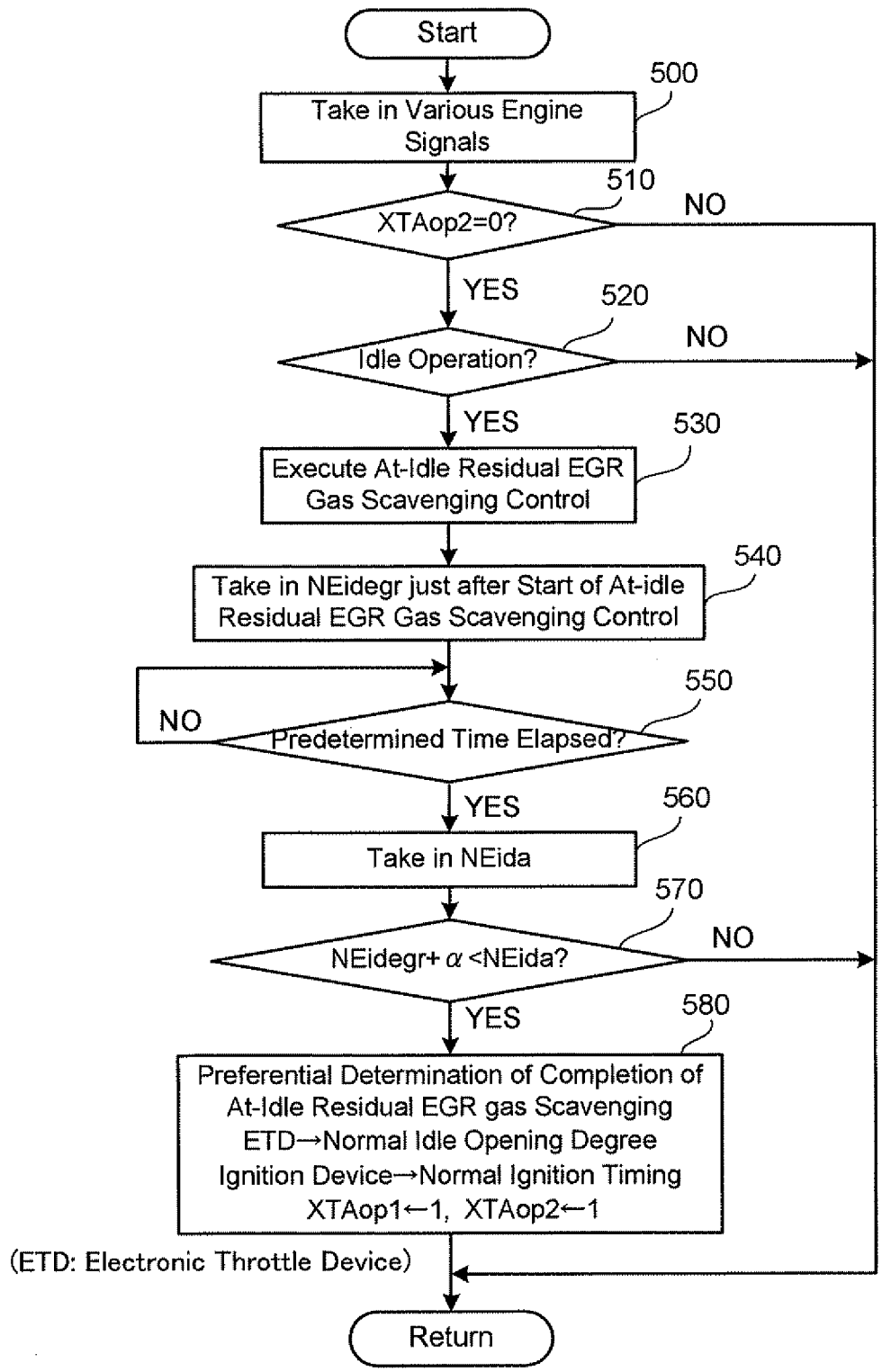
FIG. 15 is a flowchart showing one example of processing details of at-idle residual EGR gas scavenging control in the second embodiment.

In the present embodiment, the control of scavenging residual EGR gas is also performed during the idle operation of the engine 1 (the at-idle scavenging control of the invention) as well as during the deceleration operation of the engine 1 as described above. FIG. 15 is a flowchart showing one example of the processing details of the at-idle residual EGR gas scavenging control to be executed by the ECU 50. The present embodiment is directed to a case where the idle target rotation control of controlling the engine rotation speed NE to a predetermined idle target rotation speed is not performed during the idle operation of the engine 1.

When the processing shifts to this routine, the ECU 50 first, in Step 500, takes in various engine signals based on detection values and others from various sensors 51-55 and others.

In Step 510, the ECU 50 determines whether or not the second EGR rate attenuation flag XTAop2 is "0". If NO in Step 510, the ECU 50 returns the processing to Step 500. If YES in Step 510, the ECU 50 shifts the processing to Step 520.

In Step 520, the ECU 50 determines whether or not the engine 1 is in an idle operation. For example, the ECU 50 performs this determination based on the throttle valve opening degree TA and the engine rotation speed NE. The ECU 50 returns the processing to Step 500 if NO in Step 520 or shifts the processing to Step 530 if YES in 520.

In Step 530, the ECU 50 executes the at-idle residual EGR gas scavenging control. In the present embodiment, to scavenge residual EGR gas, the ECU 50 controls the electronic throttle device 14 to adjust the throttle valve 21 to a predetermined idle opening degree, thereby regulating the intake-air amount Ga at idle. Simultaneously, the ECU 50 controls the igniter 30 and the ignition plug 29 to retard the ignition timing only by a predetermined ignition retard amount. Retarding the ignition timing is intended to restrain an increase in combustion pressure in association with an increase in intake-air amount Ga.

In Step 540, the ECU 50 takes in, as scavenging idle rotation speed NEidegr, the idle rotation speed NE just after the start of the at-idle residual EGR gas scavenging control.

In Step 550, the ECU 50 waits a lapse of a predetermined time and then shifts the processing to Step 560. Herein, the predetermined time may be set to for example "0.5 seconds". In Step 560, the ECU 50 takes in an idle rotation speed NEida at that time.

In Step 570, the ECU 50 determines whether or not an addition result obtained by summing the scavenging idle rotation speed NEidegr and a predetermined value a is smaller than the idle rotation speed NEida. If NO in Step 570, it is judged that the idle rotation speed NEida does not increase in the state where the idle target rotation control is not performed and the scavenging of residual EGR gas is not completed yet, and thus the processing is returned to Step 500. If YES in Step 570, on the other hand, it is judged that the idle rotation speed NEida increases in the state where the idle target rotation control is not performed and the scavenging of residual EGR gas is completed, the processing is then shifted to Step 580.

In Step 580, the ECU 50 performs preferential determination about completion of the at-idle residual EGR gas scavenging. Herein, the preferential determination means that determination in Step 580 is enabled irrespective of the presence/absence of determination of scavenging completion of residual EGR gas in Step 130 in the flowchart of FIG. 14. The ECU 50 returns the electronic throttle device 14 (the throttle valve 21) to the normal idle opening degree and returns the ignition device to the normal ignition timing. The ECU 50 further sets the first EGR rate attenuation flag XTAop1 and the second EGR rate attenuation flag XTAop2 to "1" respectively and returns the processing to Step 500.

Herein, behaviors of various parameters related to the above at-idle residual EGR gas scavenging control are shown in time charts in FIGS. 16A to 16D.

Figure 16A:
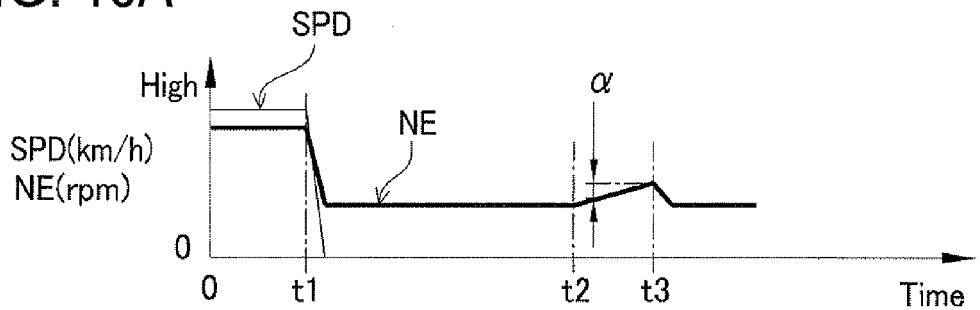
FIGS. 16A to 16D are time charts showing behaviors of various parameters related to the at-idle residual EGR gas scavenging control in the second embodiment.
Figure 16B:
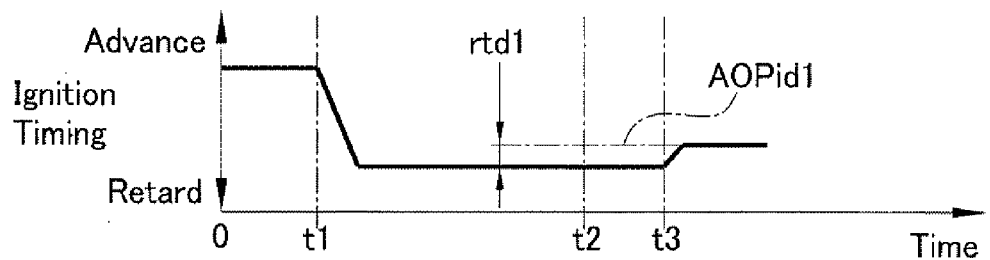
Figure 16C:
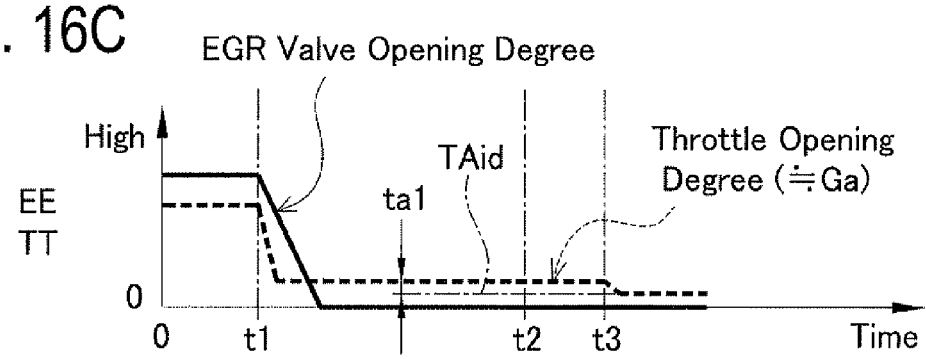
Figure 16D:
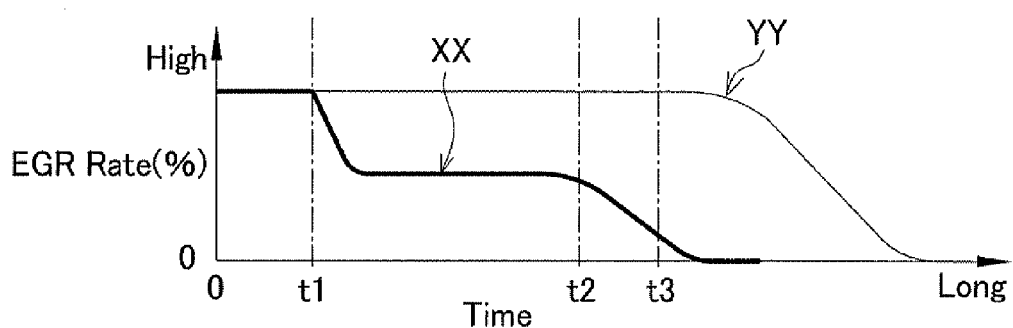

In FIGS. 16A to 16D, during steady running of a vehicle, when the vehicle starts to decelerate at time t1 and is stopped (SPD=0), the engine rotation speed NE accordingly decreases to a predetermined idle rotation speed (FIG. 16A). The ignition timing is retarded by a predetermined ignition retard amount (FIG. 16B). The EGR valve is fully closed (EGR valve opening degree=0) and the throttle valve opening degree TA is closed to a predetermined idle opening degree (FIG. 16C). In the presence of the residual EGR gas scavenging control, the EGR rate decreases to a predetermined value (FIG. 16D).

At that time, the throttle valve opening degree TA is kept to be larger by a predetermined opening degree ta1 at than a normal idle opening degree TAid in order to ensure a predetermined intake-air amount Ga (FIG. 16C). The ignition timing is retarded by a predetermined ignition retard amount rtd1 from a normal idle ignition timing AOPid1 (FIG. 16B). Accordingly, the engine rotation speed NE is kept constant at a predetermined idle rotation speed (FIG. 16A) and the EGR rate is maintained to be constant at a predetermined value (FIG. 16D).

Thereafter, when the scavenging of the residual EGR gas advances and the EGR rate starts to further decrease at time t2 (FIG. 16D), the engine rotation speed NE starts to slightly increase (FIG. 16A).

Then, at time t3, when the engine rotation speed NE increases by a predetermined value $\alpha$, the ignition retard of the ignition timing is terminated and the ignition timing starts to return to the normal idle ignition timing AOPid (FIG. 16B). The throttle valve opening degree TA is closed to the normal idle opening degree TAid (FIG. 16C). Accordingly, the EGR rate further decreases and the scavenging of the residual EGR gas is completed.

According to the above control in the present embodiment, in the case of not performing the idle target rotation control that opens and closes the electronic throttle device 14 to control the engine rotation speed NE to the predetermined idle target speed, when the ECU 50 determines that the engine 1 is in the idle operation, the ECU 50 executes the at-idle residual EGR gas scavenging control. Specifically, to scavenge residual EGR gas, the electronic throttle device 14 is closed to the predetermined opening degree and the ignition timing is retarded by the predetermined ignition retard amount by the igniter 30 and the ignition plug 29. During execution of the scavenging control, when the idle rotation speed of the engine 1 increases to the predetermined value, it is determined that the scavenging of residual EGR gas is completed, and thus the at-idle residual EGR gas scavenging control is terminated. Accordingly, during the idle operation in which the idle target rotation control is not performed, completion of scavenging of the residual EGR gas is properly determined and the at-idle residual EGR gas scavenging control is not prolonged more than necessary. This makes it possible to prevent a returning delay from the idle operation to the EGR control.

Third Embodiment

A third embodiment embodying a control apparatus for an engine according to the invention will be explained in detail with reference to the accompanying drawings.

Figure 17:
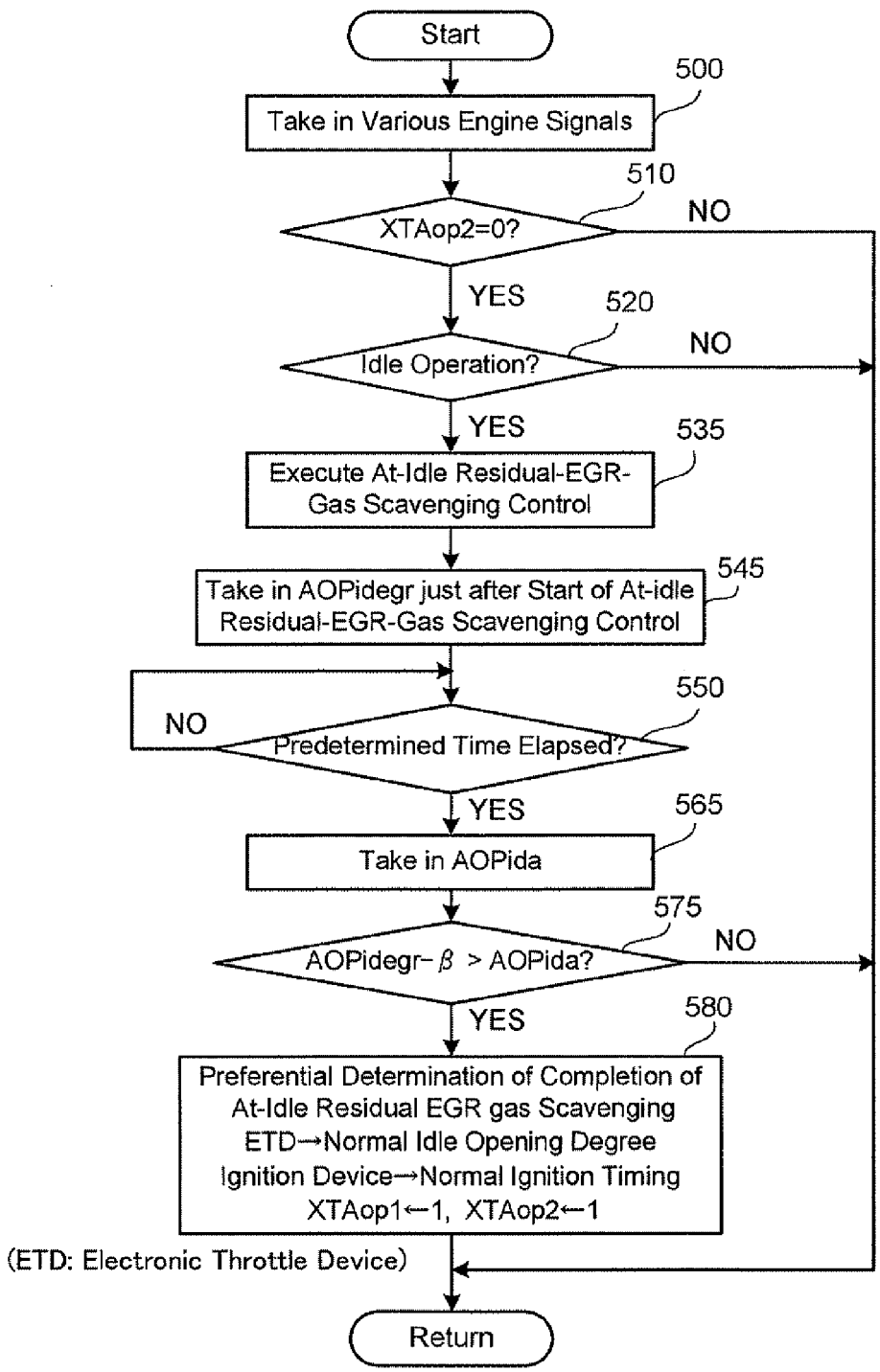
FIG. 17 is a flowchart showing one example of processing details of at-idle residual EGR gas scavenging control in a third embodiment.

The present embodiment differs from the second embodiment in the at-idle residual EGR gas scavenging control. FIG. 17 is a flowchart showing one example of the processing details of the at-idle residual EGR gas scavenging control in the third embodiment. This embodiment is directed to a case where the idle target rotation control of controlling the engine rotation speed NE to a predetermined idle target rotation speed is performed during idle operation of the engine 1.

The flowchart of FIG. 17 differs in the processings of Steps 535, 545, 565, and 575 from Steps 530, 540, 560, and 570 in the flowchart of FIG. 15. The processings of remaining Steps 500-520, 550, and 580 are the same between the flowchart of FIG. 17 and the flowchart of FIG. 15.

Specifically, in the flowchart of FIG. 17, the ECU 50 executes in Step 535 the at-idle residual EGR gas scavenging control. In the present embodiment, to scavenge residual EGR gas, the ECU 50 controls the electronic throttle device 14 to adjust the idle opening degree of the throttle valve 21 to thereby regulate an intake-air amount Ga at idle. Accordingly, the engine rotation speed NE during idle operation of the engine 1 is controlled to a predetermined idle target rotation speed. Simultaneously, the ECU 50 controls the igniter 30 and the ignition plug 29 to retard the ignition timing. In the present embodiment, the ECU 50 obtains an ignition retard amount of the ignition timing according to the intake-air amount Ga and retards the ignition timing based on the obtained ignition retard amount.

In Step 545, the ECU 50 takes in the idle ignition timing just after the start of the at-idle residual EGR gas scavenging control, as a scavenging idle ignition timing AOPidegr.

In Step 550, the ECU 50 waits a lapse of a predetermined time and shifts the processing to Step 565. Herein, the predetermined time may be set to for example "0.5 seconds". In Step 565, the ECU 50 takes in an idle ignition timing AOPida at that time.

Thereafter, in Step 575, the ECU 50 determines whether or not a result obtained by subtracting a predetermined value β from the scavenging idle ignition timing AOPidegr is larger than the idle ignition timing AOPida. If NO in Step 575, the ignition retard amount of the ignition timing is not increased to keep the engine rotation speed NE to the idle target rotation speed in a state where the idle target rotation control is performed and it is determined that scavenging of the residual EGR gas is not completed yet, the processing is returned to Step 500. On the other hand, if YES in Step 575, the ignition retard amount of the ignition timing is increased to maintain the engine rotation speed NE to the idle target rotation speed in the state where the idle target rotation control is performed and it is determined that the scavenging of the residual EGR gas is completed, the processing is shifted to Step 580.

Herein, behaviors of various parameters related to the above at-idle residual EGR gas scavenging control are shown in time charts in FIGS. 18A to 18D.

Figure 18A:
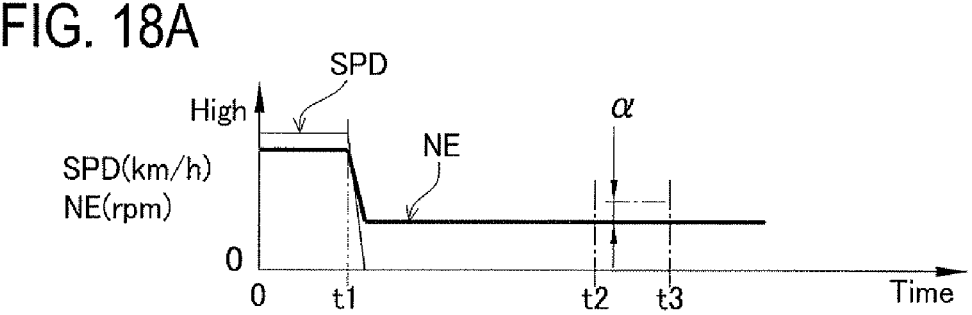
FIGS. 18A to 18D are time charts showing behaviors of various parameters related to the at-idle residual EGR gas scavenging control in the third embodiment.
Figure 18B:
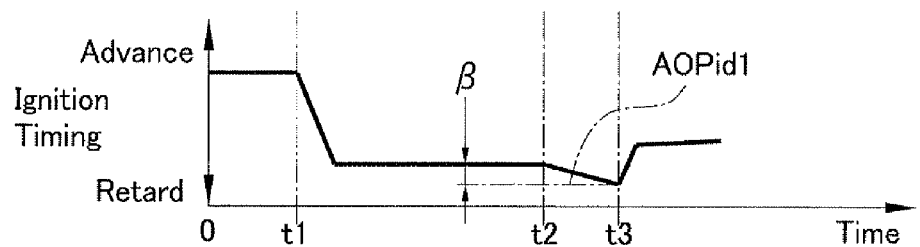
Figure 18C:
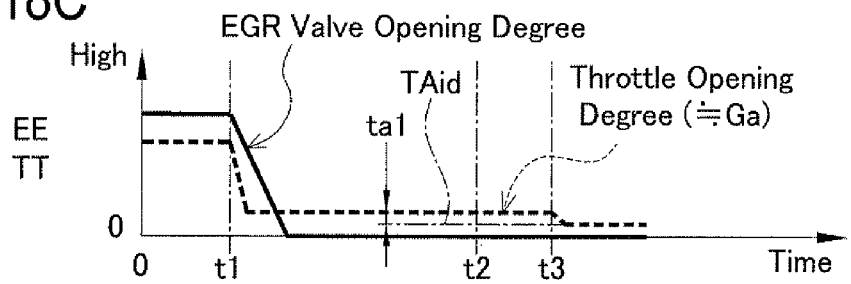
Figure 18D:
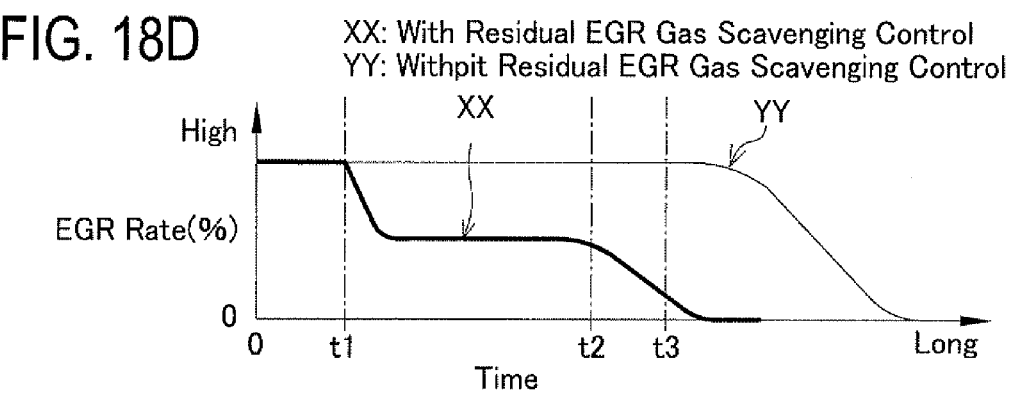

In FIGS. 18A to 18D, during steady running of a vehicle, when the vehicle starts to decelerate at time t1 and is stopped (SPD=0), the engine rotation speed NE accordingly decreases to a predetermined idle target rotation speed (FIG. 18A). The ignition timing is retarded by a certain ignition retard amount (FIG. 18B). The EGR valve is fully closed (EGR valve opening degree=0) and the throttle valve opening degree TA is closed to a predetermined idle opening degree (FIG. 18C). In the presence of the residual EGR gas scavenging control, the EGR rate decreases to a predetermined value (FIG. 18D). In the present embodiment, since the idle target rotation control is performed, the engine rotation speed NE is controlled to be constant at the predetermined idle target rotation speed (FIG. 18A).

At that time, the throttle valve degree Ta is kept to be larger by a predetermined opening degree ta1 at than a normal idle opening degree TAid to ensure a predetermined intake-air amount Ga (FIG. 18C). The ignition timing is kept on an advance side by a predetermined value β than a normal idle ignition timing AOPid1 (FIG. 18B). Accordingly, the EGR rate is kept constant at a predetermined value (FIG. 18D).

Thereafter, when the scavenging of residual EGR gas advances and the EGR rate starts to further decrease at time t2 (FIG. 18D), the engine rotation speed NE attempts to rise to the predetermined value α, but the engine rotation speed NE is kept at the idle target rotation speed by the idle target rotation control (FIG. 18A). The ignition timing is thus gradually retarded (FIG. 18B).

Thereafter, at time t3, when the ignition timing is retarded by the predetermined value β and reaches the normal idle ignition timing AOPid1 at time t3 (FIG. 18B), the throttle valve opening degree TA is closed to the normal idle opening degree TAid (FIG. 18C). Accordingly, the EGR rate further decreases and the scavenging of residual EGR gas is completed.

According to the above control in the present embodiment, in the case of performing the idle target rotation control that opens and closes the electronic throttle device 14 to control the engine rotation speed NE to the predetermined idle target rotation speed, when the ECU 50 determines that the engine 1 is in the idle operation, the ECU 50 executes the at-idle residual EGR gas scavenging control. Specifically, to scavenge residual EGR gas, the electronic throttle device 14 is closed and the ignition timing is retarded by the igniter 30 and the ignition plug 29. During execution of the scavenging control, when the ignition timing of the engine 1 is further retarded to the predetermined value, it is determined scavenging of residual EGR gas is completed and the at-idle residual EGR gas scavenging control is thus terminated. Accordingly, during idle operation in which the idle target rotation control is performed, completion of scavenging of the residual EGR gas is properly determined and thus the at-idle residual EGR gas scavenging control is not prolonged more than necessary. This can prevent a returning delay from the idle operation to the EGR control.

Fourth Embodiment

A fourth embodiment embodying a control apparatus for an engine according to the invention will be explained in detail below with reference to the accompanying drawings.

Figure 19:
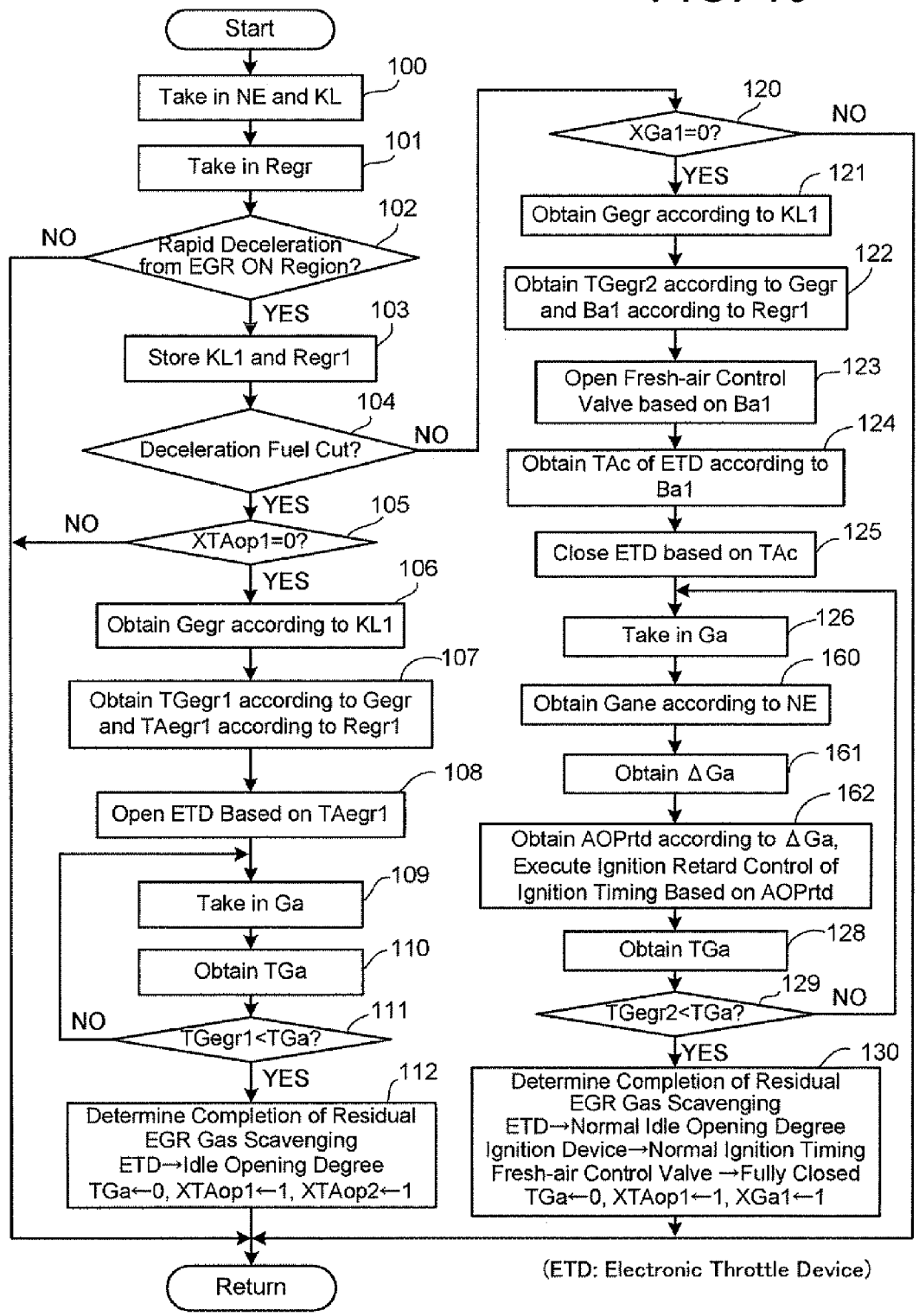
FIG. 19 is a flowchart showing one example of processing details of at-deceleration residual EGR gas scavenging control in a fourth embodiment.

This fourth embodiment differs from the first embodiment in the at-deceleration residual EGR gas scavenging control. FIG. 19 is a flowchart showing one example of the processing details of the at-deceleration residual EGR gas scavenging control in the present embodiment. The flowchart of FIG. 19 differs in the processings of Steps 160, 161, and 162 from Step 127 in the flowchart of FIG. 3. The processings of remaining Steps 100-112, 120-126, and 128-130 are the same between the flowchart of FIG. 19 and the flowchart of FIG. 3.

Figure 20:
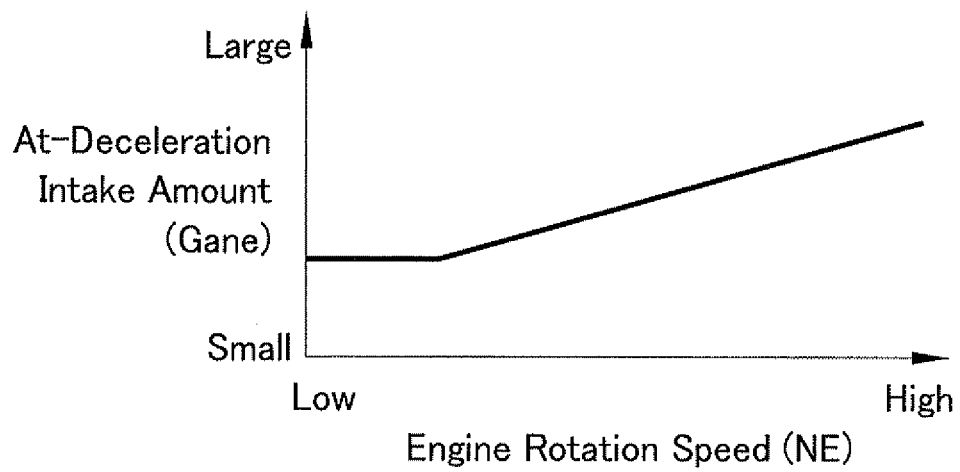
FIG. 20 is a map to be referred to in order to obtain an at-deceleration intake-air amount in the fourth embodiment.

In the flowchart of FIG. 19, specifically, the ECU 50 takes in the intake-air amount Ga based on a measurement value of the air flow meter 54 in Step 126, and then obtains an at-deceleration intake-air amount Gane according to the engine rotation speed NE in Step 160. The ECU 50 can obtain this at-deceleration intake-air amount Gane by referring to for example a previously set map as shown in FIG. 20. This map is set so that the at-deceleration intake-air amount Gane is constant in a low region of the engine rotation speed NE and linearly increases as the engine rotation speed NE increases from that region.

In Step 161, the ECU 50 obtains an at-deceleration excessive intake-air amount ΔGa. To be specific, the ECU 50 calculates this at-deceleration excessive intake-air amount ΔGa by subtracting the at-deceleration intake-air amount Gane from the intake-air amount Ga.

Figure 21:
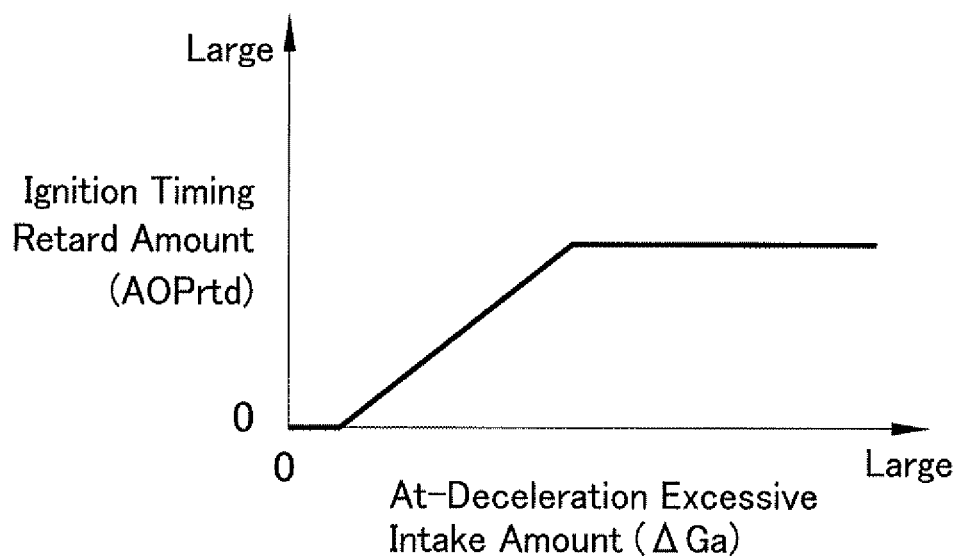
FIG. 21 is a map to be referred to in order to obtain an ignition retard amount of ignition timing in the fourth embodiment.

In Step 162, the ECU 50 obtains an ignition retard amount AOPrtd of the ignition timing according to the at-deceleration excessive intake-air amount ΔGa and executes ignition retard control of the ignition timing based on the obtained ignition retard amount AOPrtd. This ignition retard control is a processing to retard the ignition timing than the normal ignition timing to reduce the air-fuel mixture combustion pressure increased due to the air excessively taken by the at-deceleration excessive intake-air amount ΔGa in the combustion chamber 16. Herein, the ECU 50 can obtain the ignition retard amount AOPrtd of the ignition timing by referring to for example a previously set map as shown in FIG. 21. This map is set so that the ignition retard amount AOPrtd linearly increases as the at-deceleration excessive intake-air amount ΔGa gradually increases in a certain range from "0" and the ignition retard amount AOPrtd becomes constant when the at-deceleration excessive intake-air amount ΔGa becomes a certain value or more.

Thereafter, the ECU 50 obtains the accumulated intake-air amount TGa in Step 128 and then shifts the processing to Step 129.

According to the above control in the present embodiment, the ECU 50 obtains, as the at-deceleration excessive intake-air amount ΔGa, a difference between the intake-air amount Ga of intake air flowing in the intake passage 3 from the start of the at-deceleration residual EGR gas scavenging control and the at-deceleration intake-air amount Gane according to the engine rotation speed NE at that time. Further, the ECU 50 obtains the ignition retard amount AOPrtd of the ignition timing according to the obtained at-deceleration excessive intake-air amount ΔGa. The ECU 50 then controls the igniter 30 and the ignition plug 29 to retard the ignition timing based on the obtained ignition retard amount AOPrtd. Accordingly, since the ignition retard amount AOPrtd of the ignition timing is obtained according to the at-deceleration excessive intake-air amount ΔGa, the ignition retard amount AOPrtd is optimized. This can retard the ignition timing accurately and hence prevent misfire of the engine 1.

Fifth Embodiment

A fifth embodiment embodying a control apparatus for an engine according to the invention will be described in detail below with reference to the accompanying drawings.

This fifth embodiment differs from the first embodiment in the engine system and the at-deceleration residual EGR gas scavenging control.

Figure 22:
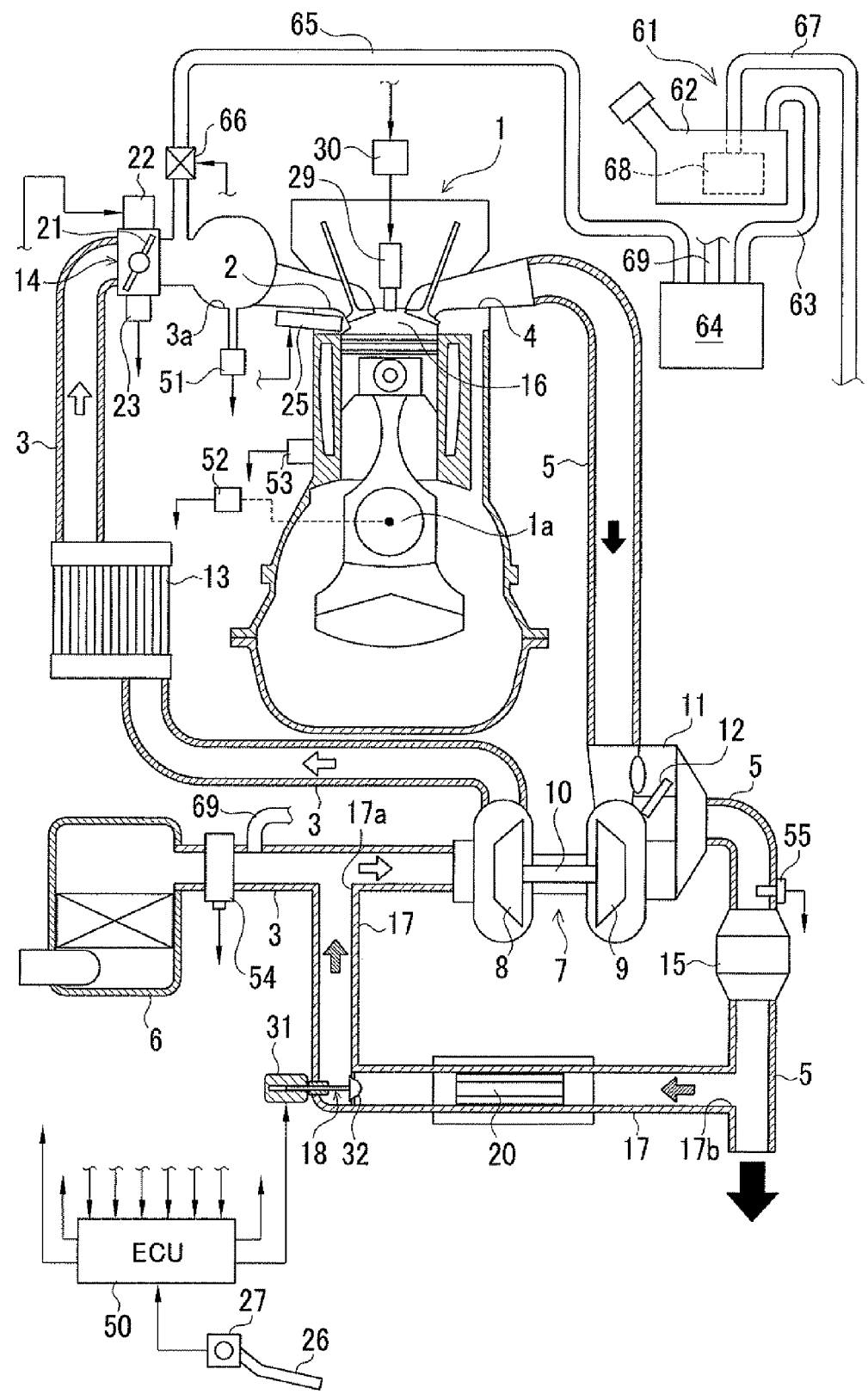
FIG. 22 is a schematic configuration view showing a supercharger-equipped engine system including an EGR apparatus of an engine in a fifth embodiment.

FIG. 22 is a schematic configuration view of a supercharger-equipped engine system including an exhaust gas recirculation apparatus (an EGR apparatus) for an engine in the fifth embodiment. In this engine system, instead of the fresh-air introduction passage 41 and the fresh-air control valve 42 in the first embodiment, an evaporated-fuel treating device 61 is provided. This device 61 is arranged to trap and treat evaporated fuel (fuel vapor) generated in a fuel tank 62 without releasing the fuel vapor to atmosphere. This device 61 includes a canister 64 for trapping once the fuel vapor generated in the fuel tank 62 through a vapor passage 63. The canister 64 contains an adsorbent (not shown) for adsorbing fuel vapor. A purge passage 65 extending from the canister 64 is connected to the intake passage 3 downstream of the electronic throttle device 14. During operation of the engine 1, the intake negative pressure generated in the surge tank 3a acts in the canister 64 through the purge passage 65, thereby purging the air containing the fuel vapor (fuel component) trapped in the canister 64 to the surge tank 3a through the purge passage 65. The air containing the purged fuel vapor is taken in the combustion chamber 16 of the engine 1 and burnt and treated therein. A purge VSV 66 provided in the purge passage 65 is controlled by the ECU 50 to regulate an air flow rate (a purge flow rate) containing fuel vapor in the purge passage 65. A fuel passage 67 extending from the fuel tank 62 is arranged to feed fuel under pressure by action of a fuel pump 68 to the injector 25. An atmosphere passage 69 connected to the canister 64 is connected to the intake passage 3 directly downstream of the air flow meter 54. This atmosphere passage 69 is arranged to introduce atmosphere from the intake passage 3 to the canister 64 when the fuel vapor and others are purged from the canister 64 through the purge passage 65. At that time, a total flow rate of a purge flow rate in the purge passage 65 and an air amount flowing through the air cleaner 6 can be measured by the air flow meter 54.

Figure 23:
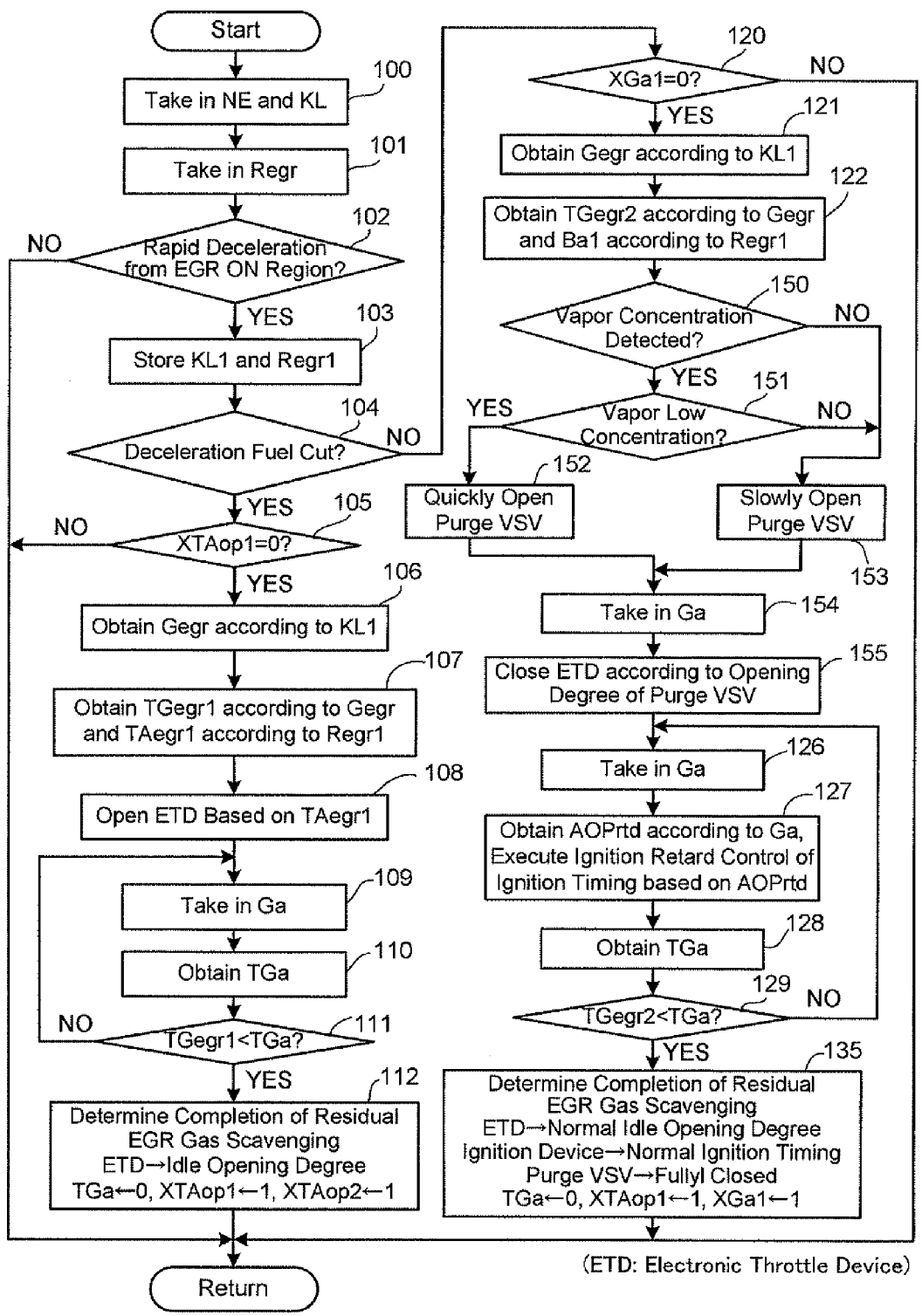
FIG. 23 is a flowchart showing one example of processing details of at-deceleration residual EGR gas scavenging control in the fifth embodiment.

FIG. 23 is a flowchart showing one example of the processing details of the at-deceleration residual EGR gas scavenging control in the present embodiment. The flowchart of FIG. 23 is different in the processings of Steps 150, 151, 152, 153, 154, 155, and 135 from Steps 123-125 and 130 in the flowchart of FIG. 3. The processings of remaining Steps 100-112, 120-122, and 126-129 are the same between the flowchart of FIG. 23 and the flowchart of FIG. 3.

In the flowchart of FIG. 23, specifically, in Step 122, the ECU 50 obtains a scavenging amount TGegr2 according to the residual-EGR-gas containing intake-air amount Gegr and a fresh-air introduction amount Ba1 according to the residual EGR rate Regr1 respectively, and then determines in Step 150 whether or not vapor concentration has been detected. Herein, the ECU 50 is configured to detect the vapor concentration based on a detection result of the air-fuel ratio sensor 55. If NO in Step 150, the ECU 50 shifts the processing to Step 153. If YES in Step 150, the ECU 50 shifts the processing to Step 151.

In Step 153, the ECU 50 slowly opens the purge VSV 66, that is, slowly and gradually opens it. Accordingly, the air that contains fuel vapor is gradually introduced from the canister 64 to the surge tank 3a. Thus, the intake air that contains residual EGR gas flowing in the surge tank 3a is diluted and the EGR rate is attenuated. Slowly opening of the purge VSV 66 is to prevent a value of an air-fuel ratio detected by the air-fuel ratio sensor 55 from becoming excessively rich.

On the other hand, in Step 151, the ECU 50 determines whether or not the fuel vapor has a low concentration. If YES in Step 151, the ECU 50 quickly opens the purge VSV 66, that is, rapidly opens it in Step 152. Accordingly, the air that contains fuel vapor is rapidly introduced from the canister 64 to the surge tank 3a. Thus, the intake air that contains residual EGR gas flowing in the surge tank 3a is diluted and the EGR rate is attenuated. The reason why the purge VSV 66 is quickly opened in this way is because the fuel vapor has a low concentration and a value of the air-fuel ratio detected by the air-fuel ratio sensor 55 is less likely to become excessively rich. If NO in Step 151, the ECU 50 slowly opens the purge VSV 66 in Step 153.

In Step 154 following Step 152 or 153, the ECU 50 takes in an intake-air amount Ga measured by the air flow meter 54.

In Step 155, subsequently, the ECU 50 closes the electronic throttle device 14 in correspondence with the opening degree of the purge VSV 66 and then shifts the processing to Step 126.

In Step 135 following Step 129, the ECU 50 determines that the scavenging of the residual EGR gas is completed and thus returns the electronic throttle device 14 (the throttle valve 21) to the normal idle opening degree, returns the ignition device to the normal ignition timing, and fully closes the purge VSV 66. Further, the ECU 50 sets the accumulated intake-air amount TGa to "0", the first EGR rate attenuation flag XTAop1 to "1", the fresh-air introduction flag XGa1 to "1", respectively, and returns the processing to Step 100.

According to the above control in the present embodiment, when the ECU 50 determines that the engine 1 is being decelerated, i.e., under deceleration, and is being supplied with fuel, i.e., under fuel supply, through the injector 25, the ECU 50 executes the at-deceleration residual EGR gas scavenging control. Specifically, to scavenge residual EGR gas, the electronic throttle device 14 is closed to a predetermined opening degree and the purge VSV 66 is opened to a predetermined opening degree, and the ignition timing is retarded to reduce the combustion pressure of air-fuel mixture in the combustion chamber 16. Accordingly, since the electronic throttle device 14 is closed to the predetermined opening degree, a certain degree of the residual EGR gas is allowed to flow to the surge tank 3a and scavenged. Since the purge VSV 66 is opened to the predetermined opening degree, the air containing fuel vapor is mixed as quasi-fresh air with the residual EGR gas flowing in the surge tank 3a through the purge passage 65, thereby attenuating the residual EGR rate Regr1 in the intake air. Furthermore, since the ignition timing is retarded, the combustion pressure in the combustion chamber 16 is reduced. In the present embodiment, the evaporated-fuel treating device 61 includes the purge passage 65 and the purge VSV 66 functioning as the aforementioned fresh-air introduction passage 41 and fresh-air control valve 42, so that it is unnecessary to additionally provide the fresh-air introduction passage 41 and the fresh-air control valve 42. The engine 1 provided with the evaporated-fuel treating device 61 can have a simple configuration by virtue of the absence of the fresh-air introduction passage 41 and the fresh-air control valve 42. This results in cost reduction of the engine system.

Sixth Embodiment

A sixth embodiment embodying a control apparatus for an engine according to the present invention will be described in detail below with reference to the accompanying drawings.

Figure 24:
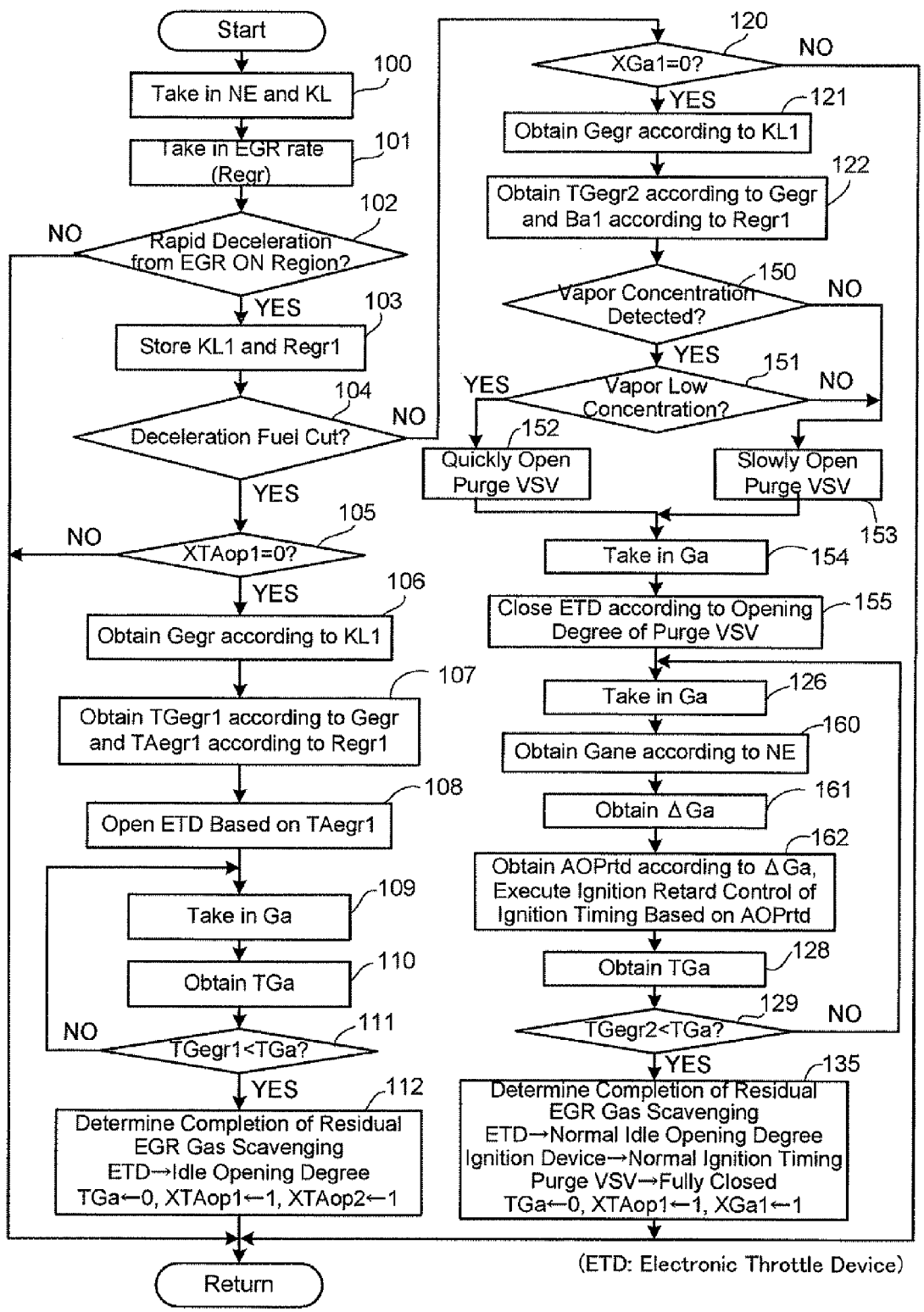
FIG. 24 is a flowchart showing one example of processing details of at-deceleration residual EGR gas scavenging control in a sixth embodiment.
Figure 25A:
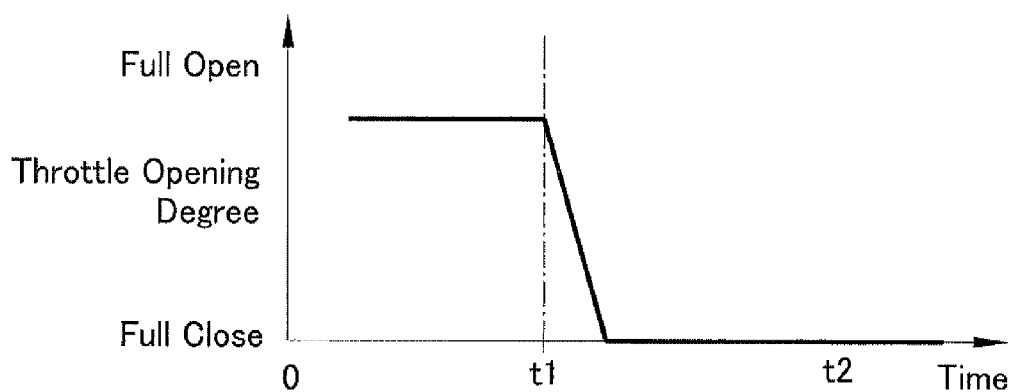
FIGS. 25A and 25B are time charts respectively showing behaviors of a throttle valve opening degree and an EGR rate before and after engine deceleration in a conventional example.
Figure 25B:
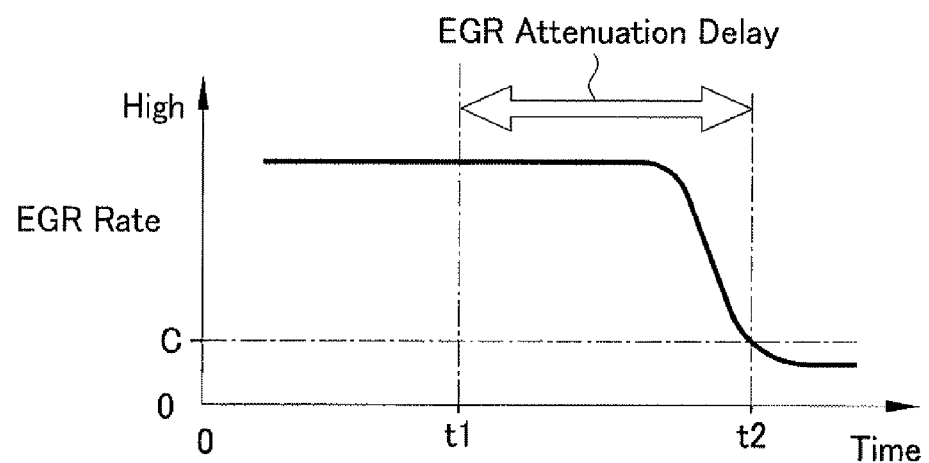

This sixth embodiment differs from the fifth embodiment in the at-deceleration residual EGR gas scavenging control. FIG. 24 is a flowchart showing one example of the processing details of the at-deceleration residual EGR gas scavenging control in the sixth embodiment. The flowchart of FIG. 24 is different in the processings of Steps 160, 161, and 162 from Step 127 in the flowchart of FIG. 23. The processings of remaining Steps 100-112, 120-122, 150-155, 126, and 128-135 are the same between the flowchart of FIG. 24 and the flowchart of FIG. 23.

The processing details in Steps 160-162 in the flowchart of FIG. 24 are the same as those in Steps 160-162 in FIG. 19 and thus their explanation is not repeated herein.

According to the above control in the present embodiment, therefore, the ignition retard amount AOPrtd of the ignition timing is obtained according to the at-deceleration excessive intake-air amount ΔGa, so that the ignition retard amount AOPrtd of the ignition timing is optimized. This can retard the ignition timing accurately and hence prevent misfire of the engine 1. Other operations and effects are the same as those in the fifth embodiment.

The present invention is not limited to the above embodiments and may be embodied in other specific forms without departing from the essential characteristics thereof.

For instance, in the above first to fourth embodiments, the inlet 41a of the fresh-air introduction passage 41 is connected to the intake passage 3 downstream of the air cleaner 6. As an alternative, the inlet of the fresh-air introduction passage may be connected to the air cleaner.

INDUSTRIAL APPLICABILITY

The present invention is utilizable in engines for vehicles irrespective of a gasoline engine or a diesel engine, for example.

| Reference Sings List | | |
|---|---|---|
| 1: Engine, | 3: Intake passage, | 3a: Surge tank, |
| 5: Exhaust passage, | 7: Supercharger, | 8: Compressor, |
| 9: Turbine, | 10: Rotary shaft, | 14: Electronic throttle device |
| 16: Combustion chamber, | 17: EGR passage, | 17a: Outlet, |
| 17b: Inlet | 18: EGR valve, | 21: Throttle valve, |
| 23: Throttle sensor, | 25: Injector | 27: Accelerator sensor, |

-continued

| Reference Sings List | | |
|---|---|---|
| 29: Ignition plug, | 30: Igniter, | |
| 41: Fresh-air introduction passage, | | |
| 41a: Inlet, | 41b: Outlet, | 42: Fresh-air control valve |
| 50: ECU, | 51: Intake pressure sensor, | 52: Rotation speed sensor, |
| 53: Water temperature sensor, | 54: Air flow meter, | 55: Air-fuel ratio sensor |
| 62: Fuel tank, | 64: Canister, | 65: Purge passage, |
| 66: Purge VSV | | |

The invention claimed is:

1. A control apparatus for an engine, including:
a supercharger placed between an intake passage and an exhaust passage of an engine and configured to increase pressure of intake air in the intake passage,
the supercharger including: a compressor placed in the intake passage; a turbine placed in the exhaust passage, and a rotary shaft connecting the compressor and the turbine so that they are integrally rotatable;
an intake-air amount regulating valve to regulate an amount of the intake air flowing in the intake passage;
an exhaust gas recirculation apparatus including an exhaust gas recirculation passage to allow part of exhaust gas discharged from a combustion chamber of the engine to the exhaust passage to flow as exhaust recirculation gas to the intake passage and recirculate back to the combustion chamber, and an exhaust gas recirculation valve to regulate a flow of the exhaust recirculation gas in the exhaust gas recirculation passage,
the exhaust gas recirculation passage having an inlet connected to the exhaust passage downstream from the turbine and an outlet connected to the intake passage upstream from the compressor;
a fresh-air introduction passage to introduce fresh air or quasi-fresh air to the intake passage downstream from the intake-air amount regulating valve;
a fresh-air amount regulating valve to regulate an amount of the fresh air or an amount of the quasi-fresh air flowing in the fresh-air introduction passage;
a fuel supply unit to supply fuel to the combustion chamber;
an ignition unit to ignite an air-fuel mixture of fuel and air to be supplied to the combustion chamber; and
an operating condition detection unit to detect an operating condition of the engine;
wherein the control apparatus further includes an at-deceleration scavenging control unit configured to execute at-deceleration scavenging control when it is determined that the engine is under deceleration based on detection of the operating condition detecting unit and under fuel supply using the fuel supply unit, the at-deceleration scavenging control including closing the intake-air amount regulating valve to a predetermined opening degree and opening the fresh-air amount regulating valve to a predetermined opening degree to scavenge exhaust recirculation gas flowing from the exhaust gas recirculation passage to the intake passage and remaining in the intake passage, and causing the ignition unit to retard the ignition timing to reduce combustion pressure of the air-fuel mixture in the combustion chamber.

2. The control apparatus for an engine according to claim 1, wherein the at-deceleration scavenging control unit is configured to close the intake-air amount regulating valve according to the fresh air amount or quasi-fresh air amount regulated by opening the fresh-air amount regulating valve.

3. The control apparatus for an engine according to claim 1, wherein the at-deceleration scavenging control unit is configured to obtain an ignition retard amount of the ignition timing according to the amount of the intake air flowing in the intake passage from start of the at-deceleration scavenging control based on a detection result of the operating condition detection unit, and to cause the ignition unit to retard the ignition timing based on the obtained ignition retard amount.

4. The control apparatus for an engine according to claim 2, wherein the at-deceleration scavenging control unit is configured to obtain an ignition retard amount of the ignition timing according to the amount of the intake air flowing in the intake passage from start of the at-deceleration scavenging control based on a detection result of the operating condition detection unit, and to cause the ignition unit to retard the ignition timing based on the obtained ignition retard amount.

5. The control apparatus for an engine according to claim 1, wherein the at-deceleration scavenging control unit is configured to obtain, as an excessive intake-air amount, a difference between the amount of the intake air flowing in the intake passage from start of the at-deceleration scavenging control based on a detection result of the operating condition detection unit and an at-deceleration intake-air amount according to a rotation speed of the engine detected at that time, and obtain an ignition retard amount of the ignition timing according to the obtained excessive intake-air amount, and cause the ignition unit to retard the ignition timing based on the obtained ignition retard amount.

6. The control apparatus for an engine according to claim 2, wherein the at-deceleration scavenging control unit is configured to obtain, as an excessive intake-air amount, a difference between the amount of the intake air flowing in the intake passage from start of the at-deceleration scavenging control based on a detection result of the operating condition detection unit and an at-deceleration intake-air amount according to a rotation speed of the engine detected at that time, and obtain an ignition retard amount of the ignition timing according to the obtained excessive intake-air amount, and cause the ignition unit to retard the ignition timing based on the obtained ignition retard amount.

7. The control apparatus for an engine according to claim 1, wherein the fresh-air introduction passage has an inlet connected to the intake passage upstream from the outlet of the exhaust gas recirculation passage and an outlet connected to the intake passage downstream from the intake-air amount regulating valve to introduce fresh air to the intake passage.

8. The control apparatus for an engine according to claim 1, wherein
the fuel supply unit includes a fuel tank,
the control apparatus further includes a canister to once trap evaporated fuel generated in the fuel tank,
the fresh-air introduction passage is a purge passage to purge air that contains the evaporated fuel, as quasi-fresh air, from the canister to the intake passage downstream from the intake-air amount regulating valve, and the fresh-air amount regulating valve is a purge control valve to regulate an amount of the quasi-fresh air flowing in the purge passage.

9. The control apparatus for an engine according to claim 1, wherein the at-deceleration scavenging control unit is configured to obtain an accumulated value of the amount of the intake air flowing in the intake passage from start of scavenging of the exhaust recirculation gas based on a detection result of the operating condition detection unit, and determine that the scavenging of the exhaust recirculation gas remaining in the intake passage is completed when the accumulated value is larger than an estimated intake-air amount needed for scavenging according to the operating condition of the engine, and terminate the at-deceleration scavenging control.

10. The control apparatus for an engine according to claim 1, wherein the at-deceleration scavenging control unit is configured so that, when the control unit further determines that the engine is in an idle operation based on detection of the operating condition detection unit, the at-deceleration scavenging control unit determines that scavenging of exhaust recirculation gas remaining in the intake passage is completed when a variation in rotation speed of the engine is smaller than a predetermine reference value, and terminates the at-deceleration scavenging control.

11. The control apparatus for an engine according to claim 1, further including an at-idle scavenging control unit configured so that, while idle target rotation control is not performed to control the rotation speed of the engine to a predetermined idle target rotation speed by opening and closing the intake-air amount regulating valve, when it is determined that the engine in an idle operation based on detection of the operating condition detection unit, the at-idle scavenging control unit executes at-idle scavenging control by closing the intake-air amount regulating valve to a predetermined opening degree and causing the ignition unit to retard the ignition timing by a predetermined ignition retard amount to scavenge exhaust recirculation gas remaining in the intake passage, and determines that scavenging of the exhaust recirculation gas remaining in the intake passage is completed when the idle rotation speed of the engine increases to a predetermined value during execution of the at-idle scavenging control, and terminate the at-idle scavenging control.

12. The control apparatus for an engine according to claim 1, further including an at-idle scavenging control unit configured so that, while idle target rotation control is performed to control the rotation speed of the engine to a predetermined idle target rotation speed by opening and closing the intake-air amount regulating valve, when it is determined that the engine in an idle operation based on detection of the operating condition detection unit, the at-idle scavenging control unit executes at-idle scavenging control by closing the intake-air amount regulating valve and causing the ignition unit to retard the ignition timing to scavenge exhaust recirculation gas remaining in the intake passage, and determines that scavenging of the exhaust recirculation gas remaining in the intake passage is completed when the ignition timing is further retarded to a predetermined value during execution of the at-idle scavenging control, and terminates the at-idle scavenging control.

13. The control apparatus for an engine according to claim 1, further including an abnormality determination unit configured so that when it is determined that the engine is under deceleration based on detection of the operating condition detection unit and not under fuel supply using the fuel supply unit, the abnormality determination unit determines normality and abnormality of the fresh-air amount regulating valve based on a change in intake pressure in the intake passage detected when the fresh-air amount regulating valve is opened from a valve closing state, a magnitude of the intake pressure, and a magnitude of the intake-air amount in the intake passage, which are detected by the operating condition detection unit.

14. The control apparatus for an engine according to claim 13, wherein when the abnormality determination unit determines that the fresh-air regulating valve is abnormal, the abnormality determination unit determines, based on the magnitude of the intake pressure or the magnitude of the intake-air amount, whether the fresh-air regulating valve is in valve-closing abnormality that the valve is out of action as remaining closed or in valve-opening abnormality that the valve is out of action as remaining opened, and the control apparatus further includes a closing control inhibition unit configured to inhibit closing control of the intake-air amount regulating valve in an idle operation region of the engine when the abnormality determination unit determines that the fresh-air regulating valve is in the valve-closing abnormality.

15. The control apparatus for an engine according to claim 13, wherein when the abnormality determination unit determines that the fresh-air regulating valve is abnormal, the abnormality determination unit determines, based on the magnitude of the intake pressure or the magnitude of the intake-air amount, whether the fresh-air regulating valve is in valve-closing abnormality that the valve is out of action as remaining closed or in valve-opening abnormality that the valve is out of action as remaining opened, and the control apparatus further includes a closing control execution unit configured to execute closing control of the intake-air amount regulating valve in an idle operation region of the engine when the abnormality determination unit determines that the fresh-air regulating valve is in the valve-opening abnormality.

* * * * *